United States Patent

Dubois et al.

[11] Patent Number: 5,909,380
[45] Date of Patent: Jun. 1, 1999

[54] DEVICE AND METHOD FOR SIMULATING AN EXAMINATION OR A SURGICAL OPERATION PERFORMED ON A SIMULATED ORGAN

[75] Inventors: Patrick Dubois; Jean-Francois Rouland; Christophe Chaillou; Sylvain Karpf; Philippe Meseure, all of Lille, France

[73] Assignees: Universite des Sciences et Techniques de Lille, Villeneuve d'Ascq Cedex; Centre Hospitalier Regional et Universitaire de Lille, Lille Cedex; Universite de Lille II, Lille, all of France

[21] Appl. No.: 08/732,405
[22] PCT Filed: May 2, 1995
[86] PCT No.: PCT/FR95/00571
  § 371 Date: Dec. 31, 1996
  § 102(e) Date: Dec. 31, 1996
[87] PCT Pub. No.: WO95/30978
  PCT Pub. Date: Nov. 16, 1995

[30] Foreign Application Priority Data

May 4, 1994 [FR] France .................................. 94 05487

[51] Int. Cl.[6] .................................................. G06G 7/48
[52] U.S. Cl. ................................ 364/578; 606/10; 606/4; 351/205; 434/262
[58] Field of Search .......................... 364/578; 351/205; 606/4, 10; 434/262

[56] References Cited

U.S. PATENT DOCUMENTS

| | | | |
|---|---|---|---|
| 4,565,197 | 1/1986 | Daly | 606/4 |
| 4,947,474 | 8/1990 | Zirm | 348/78 |
| 5,029,220 | 7/1991 | Juday | 382/128 |
| 5,049,147 | 9/1991 | Danon | 606/10 |
| 5,376,007 | 12/1994 | Zirm | 434/262 |
| 5,512,965 | 4/1996 | Snook | 351/205 |
| 5,562,656 | 10/1996 | Sumiya | 606/4 |

FOREIGN PATENT DOCUMENTS

WO 93/16631 9/1993 WIPO.

OTHER PUBLICATIONS

Biomedizinishce Technik, vol. 39, No. 1/2, H. Zenz et al., *Interaktives multimediales Lernsystem zum Studium des Primären Offenwinkelglaukoms*, Berlin.

Chip Zeitschrift Fuer Mikrocomputer–Technik, No. 6, Th. Brandenburg, *eine leiche macht karriere*, Wurzburg.

*Primary Examiner*—Kevin J. Teska
*Assistant Examiner*—M. Irshadullah
*Attorney, Agent, or Firm*—Merchant, Gould, Smith, Edell, Welter & Schmidt

[57] ABSTRACT

A device for simulating a procedure on a simulated organ by an operator, which simulated organ is generated using at least one digitized photograph. The device includes a binocular for observing the organ, fitted with a control stage system, to displace the binocular in an orthonormal triaxial frame. The device further includes means for synthesizing a computer image of the simulated organ, which includes means for simulating a slit lamp, adjusting the dimensioning of the slit lamp, and means for simulating magnifying optics. The device further includes one or two miniaturized video screens, computing means generating the image and projecting it on the screen(s), and means for simulating a lens for examining the organ. A method for simulating a procedure on a simulating organ using at least one digitized photograph includes simulating a slit lamp, simulating magnifying optics, generating a video image, simulating a lens, so that changes in any of the parameters relating to the displacement of the binocular, adjustment of the slit lamp, (magnification, or the examination lens modifies the video image of the simulated organ in real-time.

24 Claims, 12 Drawing Sheets

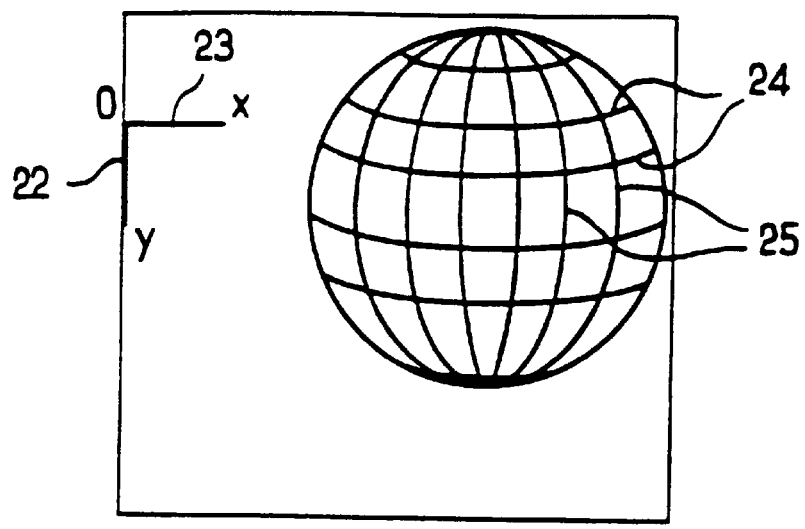
FIG._4
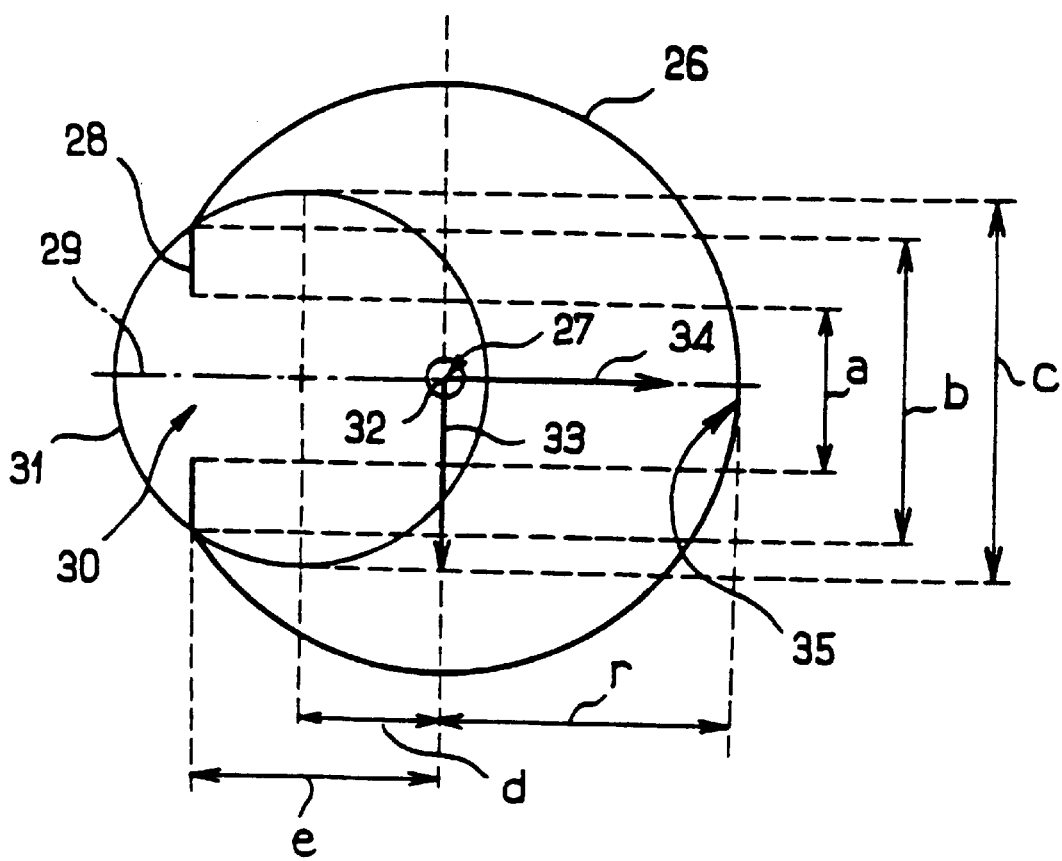
FIG._5

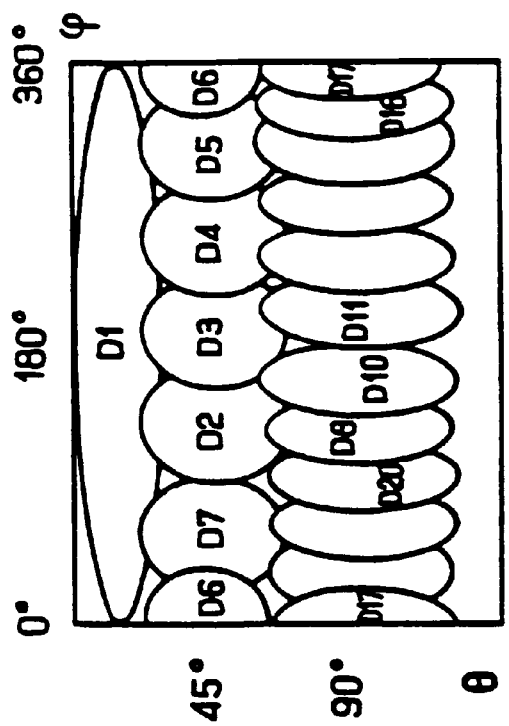
FIG._7
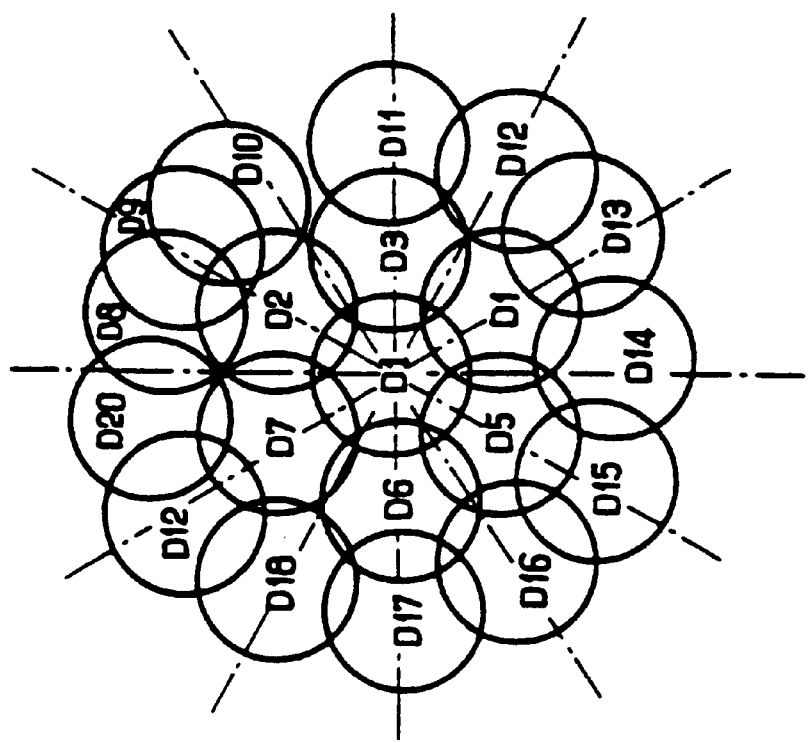
FIG._6

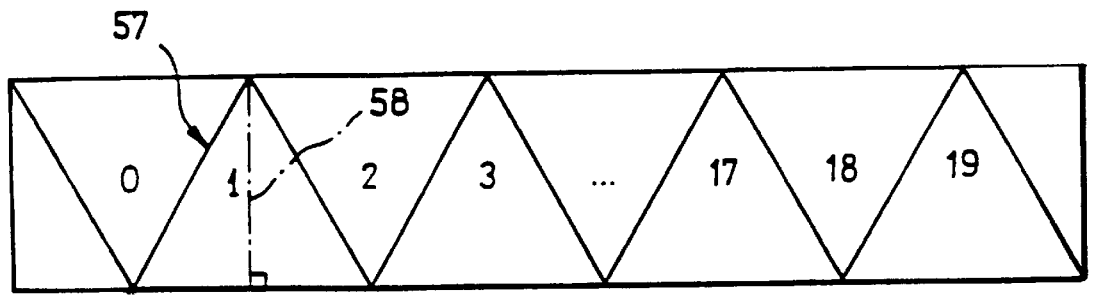
FIG_11
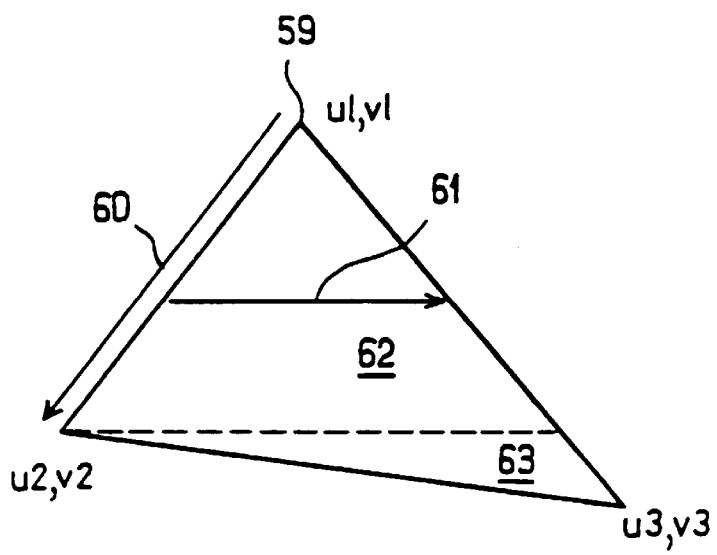
FIG_12
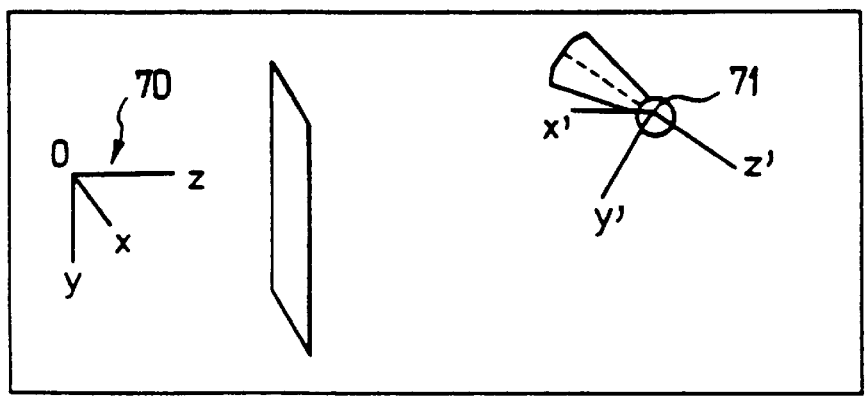
FIG_13

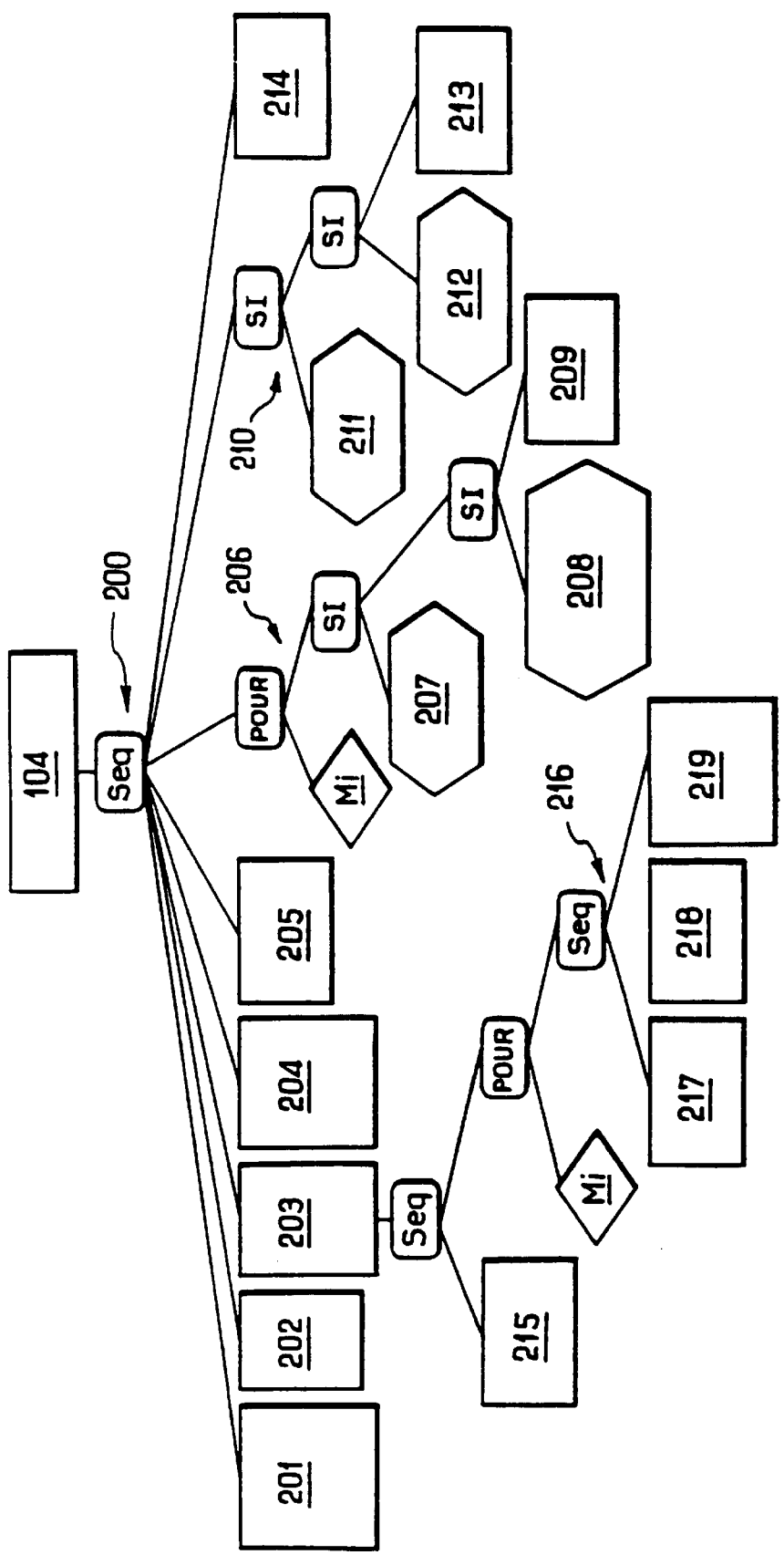
FIG_18

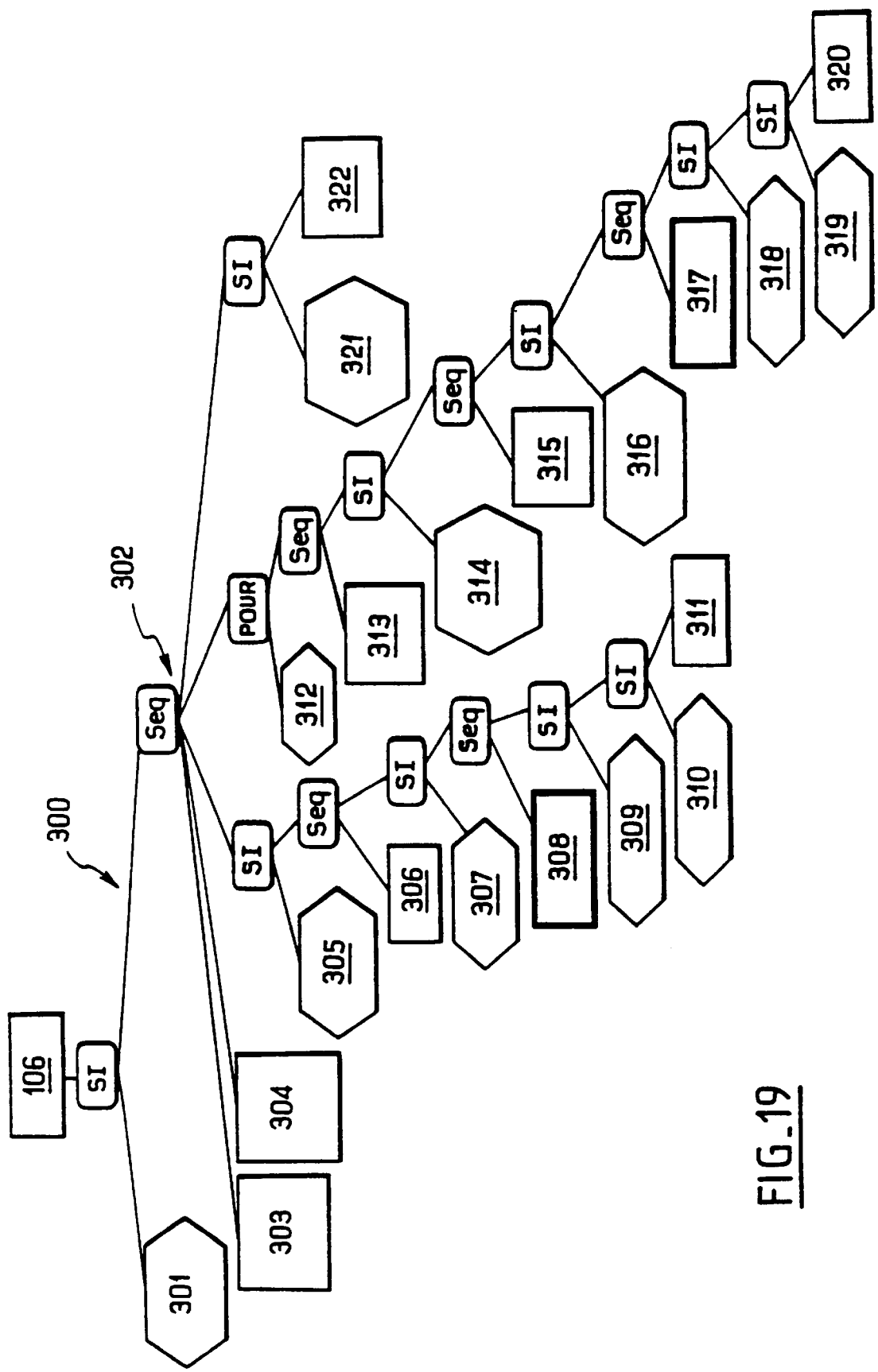
FIG._19

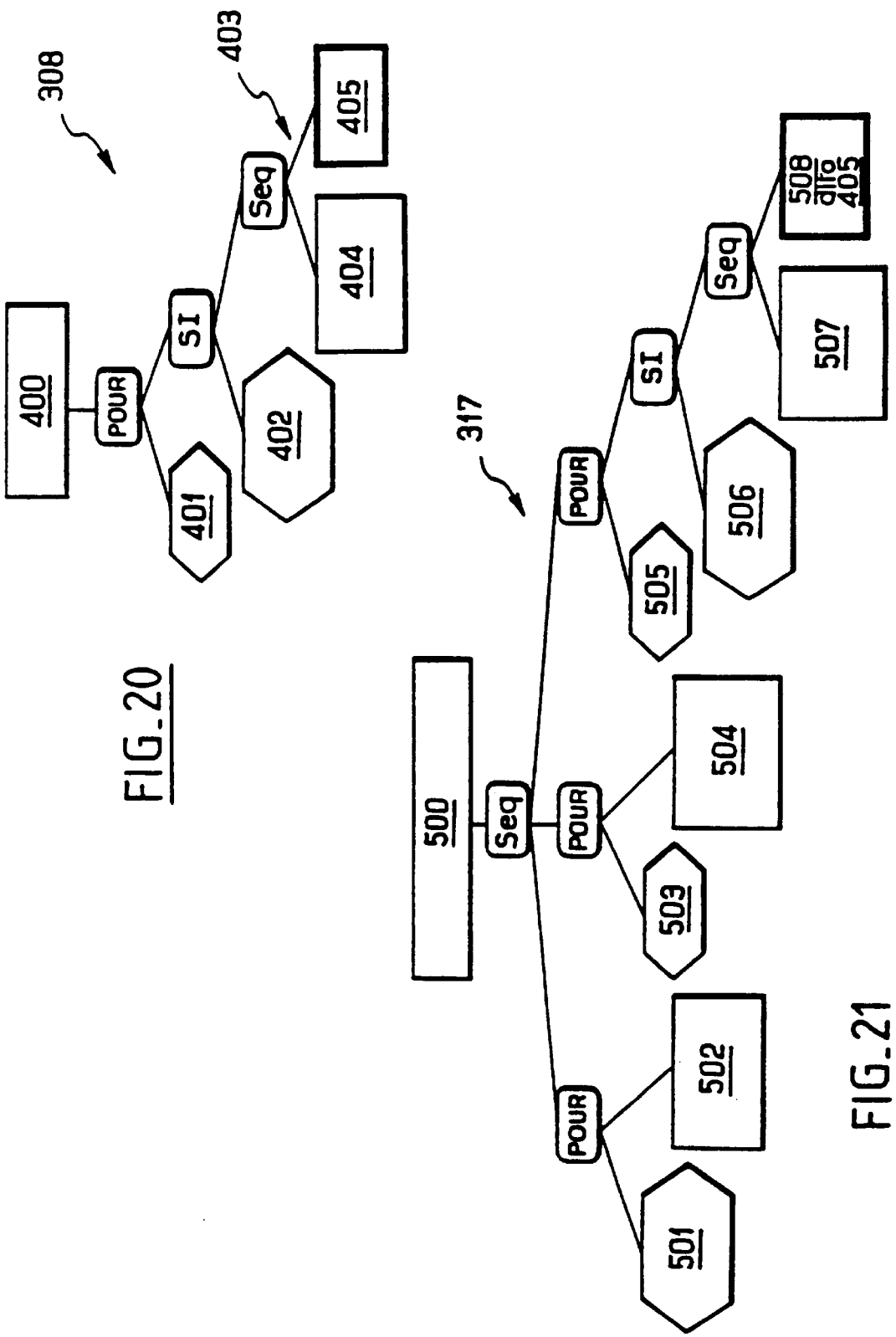

DEVICE AND METHOD FOR SIMULATING AN EXAMINATION OR A SURGICAL OPERATION PERFORMED ON A SIMULATED ORGAN

This application is a National Stage filed under 35 U.S.C. 371, of PCT/FR95/00571, filed May 2, 1995 which claims priority from France application Serial Number 94/05487, filed May 4, 1994.

The present invention relates to a device and a method for simulating an examination and/or a surgical operation, performed by an operator on a simulated organ.

The term organ is intended to mean any clearly differentiated part of a living body which fulfils a specific function, such as an eye, an ear, a nose, etc.

The invention has a particularly important, but not exclusive, application in the field of ophthalmology, in the context of teaching the examination of the eye and the treatment of the fundus of eye by photocoagulation, using a laser radiation.

It is known that, like the surgical technique of photocoagulation by impact of a laser radiation, the examination of the eye uses a device comprising an apparatus referred to as a biomicroscope, including a binocular, magnifying optics, a source (slit lamp) for illuminating the eye and, if appropriate, a laser radiation source in the case of an apparatus equipped for treating the eye by photocoagulation.

The apparatus is activated by a control stage system arranged on an examining table.

The device also comprises an examination lens designed to be manipulated by the operator performing the examination. The examination lens is placed directly on the cornea and its optical design makes it possible to observe the various regions of the eye.

Currently, training or teaching in the field of eye examination and laser-radiation treatment can only take place during interventions performed on patients.

This practice has the drawback of limiting the training just to those pathologies which are encountered.

Furthermore, it entails risks of injury due to mistakes in manipulating the laser.

Another teaching method consists in using porcelain phantom eyes. However, such a method is limited just to observation and does not allow prior evaluation of the effects of a laser radiation in some particular circumstances.

The object of the invention is to remedy these drawbacks by proposing a device and a method which suit practical requirements better than those previously known, in particular because they no longer require intervention on the organ proper and because it allows genuine dissociation of the therapy process from the learning process.

To this end, the invention essentially proposes a device for simulating an intervention on an organ by an operator, characterized in that it includes a binocular, known per se, for observing the organ and fitted with a control stage system actuable manually by the operator, the said system being designed to displace the binocular in an orthonormal triaxial frame Ox, oy, Oz, means for simulating a slit lamp and means for simulating means for adjusting the dimensioning of the said slit lamp which is capable of illuminate the organ, means for simulating magnifying optics, one or two miniaturized video screens integral with the binocular, computation means capable of generating a video image of the simulated organ to be examined and of projecting the said image onto the said miniaturized video screen or screens, and means for simulating a lens, for examining the organ, that is fitted with means for manual actuation by an operator, which are designed to simulate the relative displacement of the said simulated examination lens relative to the said video image, the said simulation means and the said computation means being designed so that the changing of any one of the parameters relating to the displacement of the binocular, to the adjustment of the slit lamp, to the magnification or to the examination lens modifies the video image of the simulated organ in real-time or substantially in real-time.

The general concept of the invention actually relies on the simulation of the image of the patient's organ by a synthetic computer image.

The usual observation conditions are furthermore sure to be respected by virtue of the preservation of the binocular and its control stage system, which remain identical to those in the prior art.

The emission of a laser radiation and its control panel, the slit lamp and its adjustment means, the magnification of the biomicroscope and the examination lens are, on the other hand, entirely simulated.

For its part, the patient's organ is replaced by one or two video screens, integrated with the biomicroscope.

A single screen will make it possible to supply the two objectives of the binocular with the same image, whereas two screens make it possible to supply one image per objective.

To carry out these simulations according to the invention, the parameters conditioning the visualized image were determined and selected.

These were parameters relating:

to the displacement of the binocular relative to the table, and therefore to the patient's organ. These displacements consist of three translational movements in mutually orthogonal directions, namely right-left up-down and forward-back, with the latter translation focusing the image;

to the operation of the laser radiation emitter, of which radiation it is necessary to be able to modify the size of the impact spot, and the intensity and the duration, and for which it is necessary to be able to control the triggering of the shot. The position of the impact spot on the organ is, for its part, governed by a micromanipulator acting on a simulated deflection mirror that can move about two perpendicular axes;

to the adjustments of the slit lamp, which concern the height and the width of the slit as well as the power of the lamp;

to the magnification of the biomicroscope, the value of which modifies the explored field;

to the movements of the examination lens, which movements are described by three rotations allowing various regions of the organ to be investigated.

The device according to the invention is therefore designed so that the changing of any one of these parameters modifies the image in real-time.

A set of sensors are furthermore associated with them in order to encode the information which describes them and to transmit this information to the computer which generates the synthetic image projected onto the miniaturized screen or screens integral with the biomicroscope.

As regards the simulation of the examination lens, it should be recalled that there are various types of examination lens.

Those most commonly used are the three-mirror and pantoscopic lenses. Each of these types of lenses is characterized by its optical design, in particular the number and the inclination of its mirrors. With the invention, the use of a suitable mathematical model will make it possible to adapt the simulation software to the choice of lenses adopted.

In the embodiment more particularly described here, applied to the eye, the lens is placed on the cornea. Its movements are described by three rotations, one about its axis of revolution and the other two about the centre of the cornea, respectively in a horizontal plane and in a vertical plane.

Since one of the objects of the simulation device according to the invention is moreover to teach the identification of pathologies of the organ, the simulation of the image of the patient's organ is obtained using digitized photographs, which allows a very realistic organ texture display.

A teaching-aid software furthermore, by way of example, makes it possible to facilitate the use of the device in varied situations, described in the databases of images and clinical data. Means for recording the performing of the teaching session, which allow it to be studied again off-line, are also advantageously provided.

Finally, the evaluation, always validated by an expert, allows a trainee operator to be presented with situations of a complexity suited to his or her level.

In advantageous embodiments, one and/or the other of the following arrangements are therefore also employed:

- the device furthermore includes means for simulating a laser radiation, including a mobile control element actuable by the operator, and means for simulating the impact of the said laser radiation on the organ when the operator acts on the said mobile control element;
- the means for simulating the laser radiation include means making it possible to simulate the size of the impact spot, and the intensity and the duration of the said radiation, the mobile control element including means for adjusting the position of the impact spot on the video image of the simulated organ, the said adjustment means comprising a micromanipulator designed to act on a simulated deflection mirror that can move about two perpendicular axes;
- the means for simulating the slit lamp comprise means for simulating the height and the width of the slit, and means for simulating the power of the lamp;
- the simulation means include a set of potentiometric sensors designed to encode the information describing the said parameters or to transmit it to the said computation means;
- the device includes a single sensor consisting of a biaxial potentiometric system designed to register entirely in a reference frame, referred to as the absolute frame, the absolute angular position of the said manual actuation means which are designed to simulate the relative displacement of the examination lens relative to the video image of the organ;
- the device furthermore includes means for recording the performance of the simulated intervention on the organ;
- since the organ is the fundus of eye, the simulated examination lens is a lens with three mirrors whose movements are described by three rotations, one about its axis of revolution and the other two about the centre of the cornea of the eye whose bottom is simulated, respectively in a horizontal plane and in a vertical plane, the spherical optical lens being modelled by a circle in one plane and the three mirrors by three planes;
- the computation means capable of generating a video image of the simulated fundus of eye to be examined are designed to generate such an image from at least one digitized photograph, the eye model used being a sphere cut into facets, the iris of which is modelled by a flat ring;
- the computation means capable of generating a video image of the eye are designed to reconstruct a complete image of the eye from a plurality of digitized photographs, by juxtaposing the said photographs edge-to-edge while attempting to respect the continuity of the blood vessels.

The invention also proposes a method for simulating an intervention on an organ by an operator, the said operator using a binocular, for observing the organ, which is fitted with a manually actuable stage system and designed to displace the binocular in an orthonormal triaxial frame Ox, Oy, Oz, characterized in that the presence of a slit lamp and the dimensioning of the said slit lamp are simulated by computation, magnifying optics are simulated by computation, a video image of the simulated organ to be examined is generated by computation and the said image is projected onto a miniaturized video screen integral with the binocular, a lens for examining the fundus of eye is simulated by computation, and the relative displacement of the said simulated examination lens relative to the said video image is simulated by actuation of a manual control by the operator, the said simulations being designed so that the changing of any one of the parameters relating to the displacement of the binocular, to the adjustment of the slit lamp, to the magnification or to the examination lens modifies the video image of the simulated organ in real-time or substantially in real-time.

In advantageous embodiments of the method, one and/or the other of the following arrangements are also employed:

- a laser radiation is furthermore simulated by computation, the simulated operation and displacement of which are actuated by the operator acting on a mobile control element, and the impact of the said laser radiation on the organ when the operator acts on the said mobile control element is simulated by computation;
- during the simulation of the laser radiation, the size of the impact spot of the said radiation, and its intensity and its duration are simulated by computation and the position of the impact spot on the video image of the simulated organ is adjusted by actuation on a micromanipulator designed to act on a simulated deflection mirror which can move about two perpendicular axes;
- the impacts of the laser radiation are integrated in the simulated video image, without plotting the said image on the screen during a shot, and the dazzling observed after a laser shot is simulated by making the colours of the organ of the said simulated video image reappear progressively;
- during the simulation of the slit lamp, the height and the width of the slit and the power of the lamp are simulated;
- the information describing the said parameters is encoded by means of a set of sensors and is transmitted to the computation means, generating the video image of the simulated eye, which can project the said simulated image onto the said miniaturized screens integral with the binocular while modifying the said image in real-time as a function of the said parameters;
- in order to generate the video image of the simulated organ an image data file, called "map", is compiled from digitized photographic images by identifying for each of the said pixels, four degrees of freedom, namely the longitude ($\phi$), the latitude ($\theta$), the image rotation ($\nu$) and the separation($\chi$), for each pixel, a function $f(\phi, \theta, \nu, \chi)$ is calculated, making it possible to obtain a point in the map of the organ to be visualized, this point is illuminated on the screen of a computer used with its predefined colour, the matching coherence between the said adjacent photographic images to be visualized is visually checked on the screen, if the result is not satisfactory, the values of $\phi$, $\theta$, $\nu$, and $\chi$ are changed and the calculations and the display are reiterated until the result is satisfactory, in which case the image is assembled;.

smoothing of the video image is generated by computing a plurality of image textures and by plotting the colour of a pixel from a linear interpolation between two consecutive textures;

in order to plot one part of the simulated organ in another part belonging to the said organ, use is made of polygon cutting employing the Sutherland-Hodgman algorithm;

the angular position of the actuated manual control is registered fully in order to simulate the relative displacement of the simulated examination lens by a single sensor;

the performance of the simulated intervention on the organ is recorded;

the organ being a bottom of the eye, in order to simulate the examination lens, a lens with three mirrors is simulated, the movements of which are described by three rotations, one about its axis of revolution and the other two about the centre of the cornea of the simulated fundus of eye, respectively in a horizontal plane and in a vertical plane, by modelling the spherical optical lens by a circle in a plane and the three mirrors by three planes;

a video image of the simulated eye to be examined is generated from at least one digitized photograph, the eye model used being a sphere cut into facets, the iris of which is modelled by a flat ring;

the said video image of the eye is generated by reconstructing a complete image of the eye from a plurality of digitized photographs and by juxtaposing the said photographs edge-to-edge while attempting to respect the continuity of the blood vessels.

The invention will be understood more clearly on reading the following description of the embodiments, given by way of non-limiting example, in the field of ophthalmology.

The description refers to the drawings which accompany it, in which:

FIG. 4 illustrates the possibilities of displacing the simulated examination lens when one of the parameters (x or y) is kept constant.

FIG. 5 is a schematic side view representing a human eye model used in the simulation according to the embodiment of the invention more particularly described here.

FIGS. 6 and 7 illustrate the reconstruction of a fundus of eye from photos allowing the compilation of the database of simulated fundi of the eye.

Figure 9A:
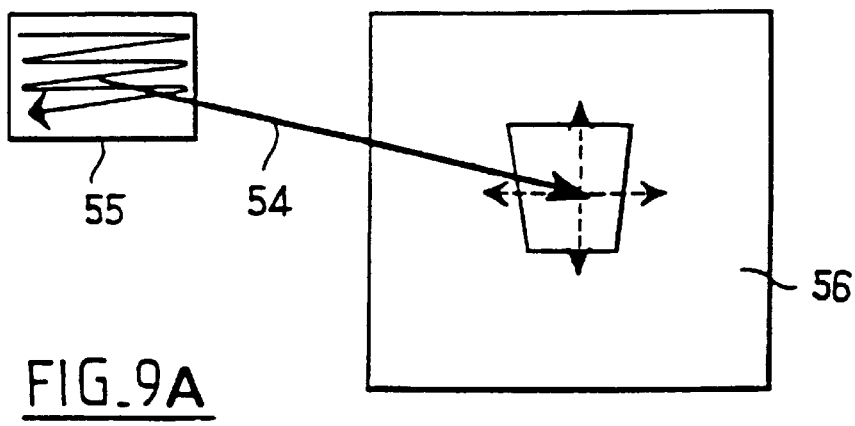
Figure 9B:
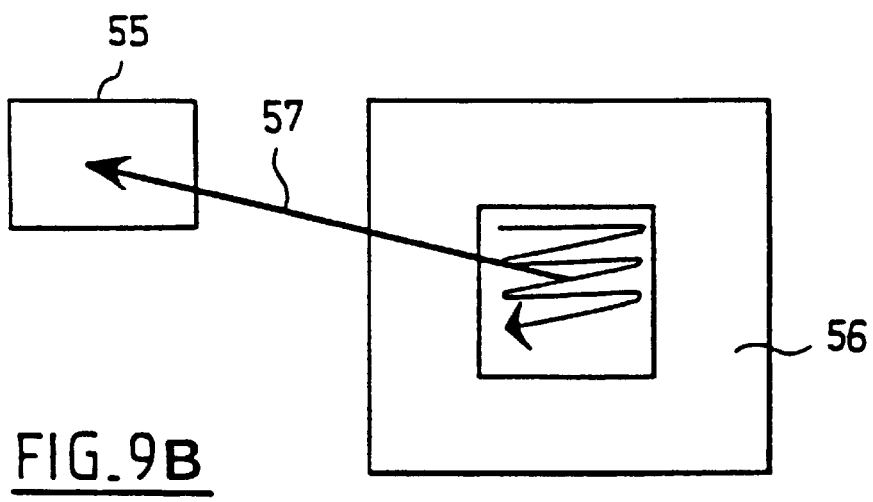

FIGS. 9A and 9B schematically show the two steps making it possible to obtain the approximate model of the eye according to one embodiment of the invention.

Figure 10:
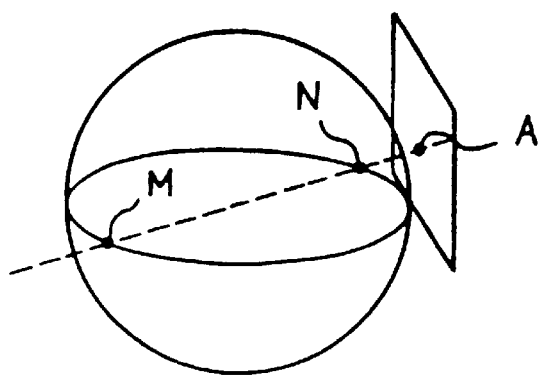

FIG. 10 illustrates the window scanning principle used in the embodiment of the invention more particularly described here.

FIGS. 11 and 12 illustrate the so-called facetting principle also used in one embodiment of the invention.

FIG. 13 is a diagram of the modelling of the scene representing the respective positions of the operator, of the patient's eye and of the slit lamp.

Figure 14:
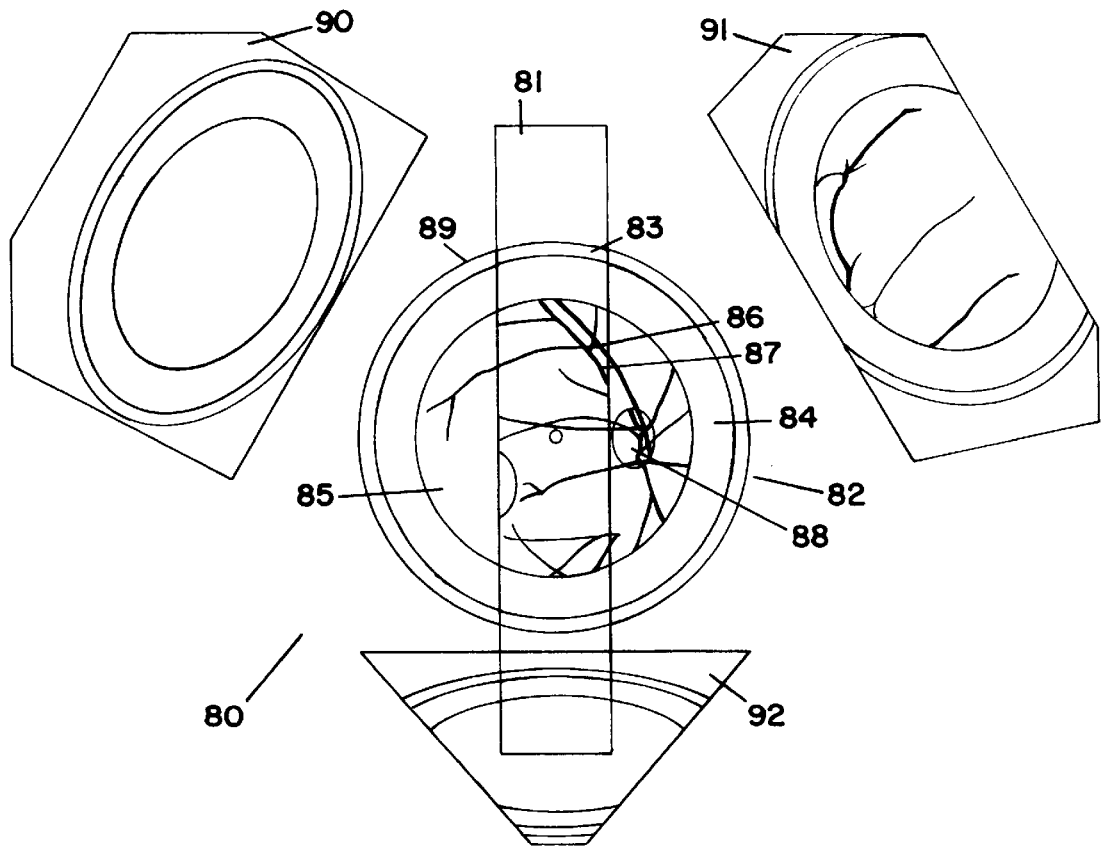
Figure 15:
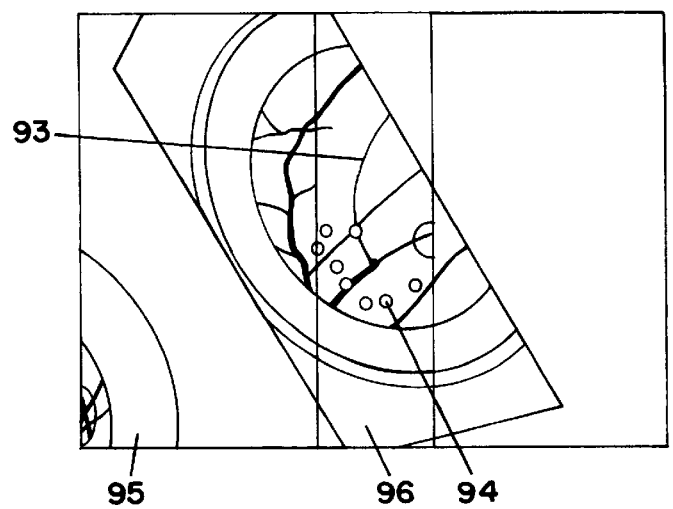

FIGS. 14 and 15 respectively give a view of the elements of the fundus of eye to be plotted and a view in one of the mirrors, which are obtained with the visualization algorithms according to one embodiment of the invention.

Figure 16:
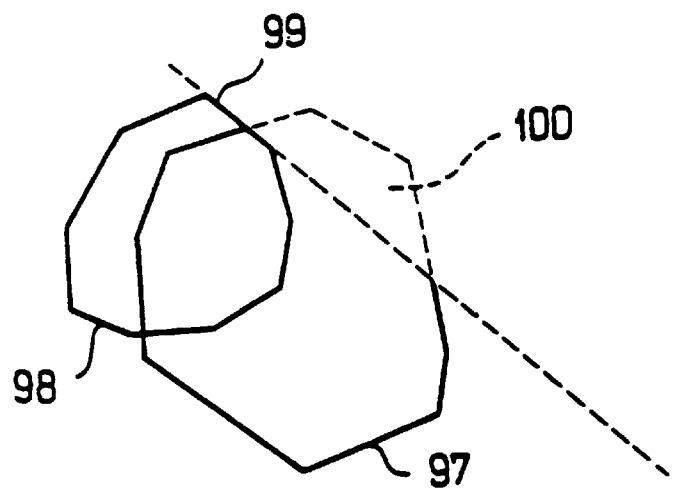

FIG. 16 represents the principle of the Sutherland-Hodgman algorithm which is also advantageously used according to the invention.

Figure 17:
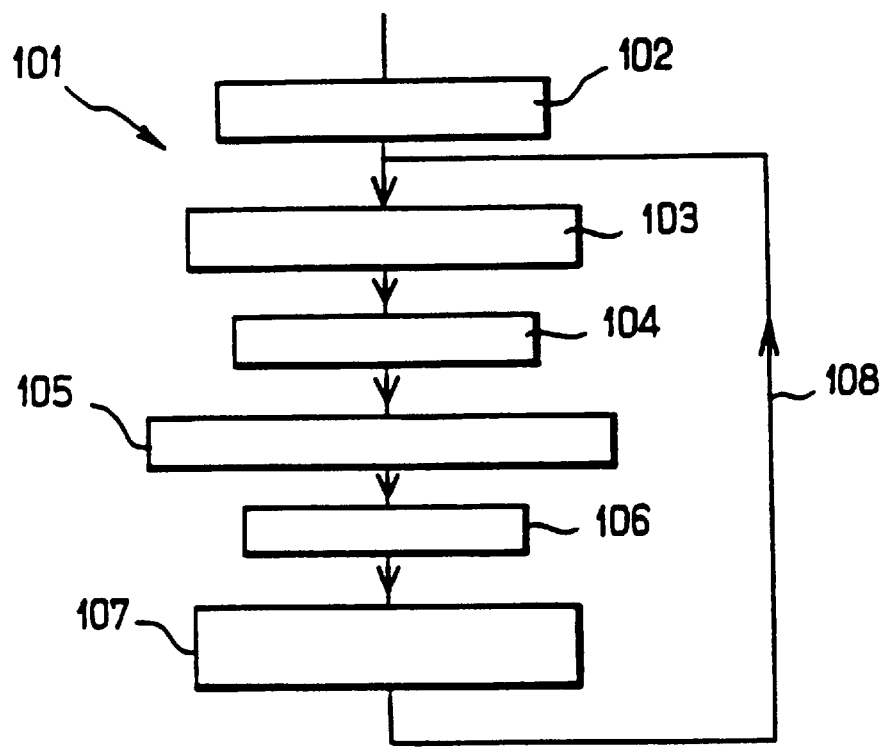

FIG. 17 gives the flowchart of the principal algorithm used for plotting the image according to the embodiment of the invention more particularly described here.

FIGS. 18 to 23 give the programme trees illustrating the precomputation and the plotting of the fundus of eye, according to a preferred embodiment of the method of the invention.

Figure 1:
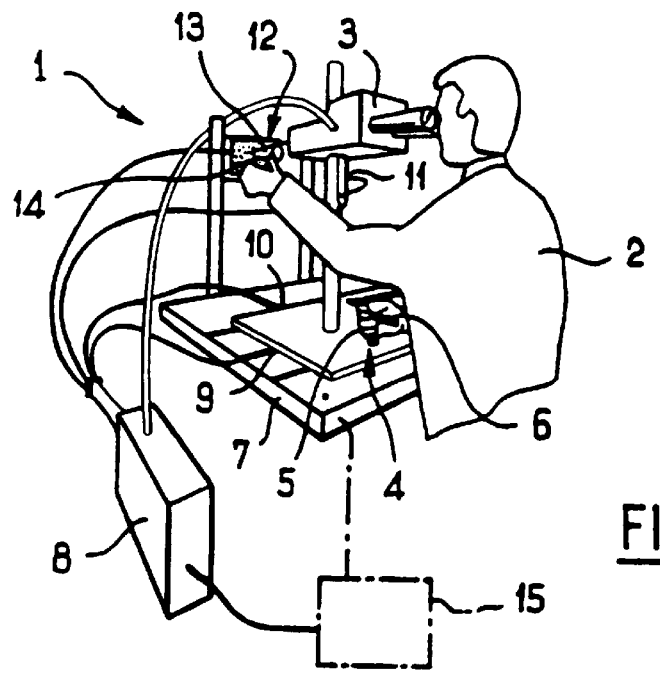
FIG. 1 is a schematic perspective view of a device according to one embodiment of the invention.

FIG. 1 shows a device 1 for simulating an intervention on a fundus of eye by an operator 2. The device 1 includes an observation binocular 3, known per se, fitted with a control stage system 4 that can be actuated manually at 5 by the operator using a stick 6, in a manner known per se. The system 4 allows the binocular to be displaced in an orthonormal triaxial frame Ox, Oy, Oz, the Ox, Oy plane of which is parallel to or coincides with the support table 7 of the binocular.

The device 1 comprises a computer 8, for example consisting of a microcomputer of the PC type fitted with an INTEL 486 microprocessor and sufficient memory to store the synthetic images obtained by scanning photographs of the fundus of eye, for example 16 megabytes of main memory and 500 megabytes of mass storage, for example of the hard disk type.

The microcomputer includes an input/output interface card connected, on the one hand, to three linear potentiometric sensors 9, 10 and 11, for example of the type manufactured by the French company Meiri and marketed under the reference REC342XD103, for detecting the displacements of and for positioning the binocular 3 relative to the table 7 in the Ox, Oy, Oz frame and, on the other hand, to a micromanipulator 12 comprising a small joystick 13 whose rotational movements about x, y, z are measured by a triaxial joystick potentiometric system, for example of the type manufactured by the company Lextronic and marketed under the reference 124-C, which allows direct simulation, by manual actuation at 14 by the operator, of the relative movements of the simulated examination lens relative to the simulated fundus of eye, this being done by performing hand movements as in the case of exploring a real fundus of eye.

For their part, the controls of the slit lamp and those of the laser are manifested by multiple-positioned switches and potentiometers which are connected to the computer 8 and are schematically represented at 15 (by a dot/dash line in FIG. 1).

A pedal switch (not shown) makes it possible, if appropriate, for the operator 2 to trigger the shot of an entirely simulated laser radiation, of which the control box (also not shown) is reproduced in full.

All the input/output variables are, for example, sampled using the 12 bit format.

As has been seen, the examination lens according to the invention is furthermore entirely simulated by computation.

In order to make it possible to simulate all types of examination lenses, the inventors chose to simulate a three-mirror lens, which makes it possible to synthesize the characteristics of the other examination lenses.

It actually allows both direct and indirect observation of the fundus of eye. The simulator can thus be adapted to other types of examination lens, without having to modify or supplement the computation programme which makes it possible to substitute a direct view for an indirect view, or vice-versa.

Figure 2:
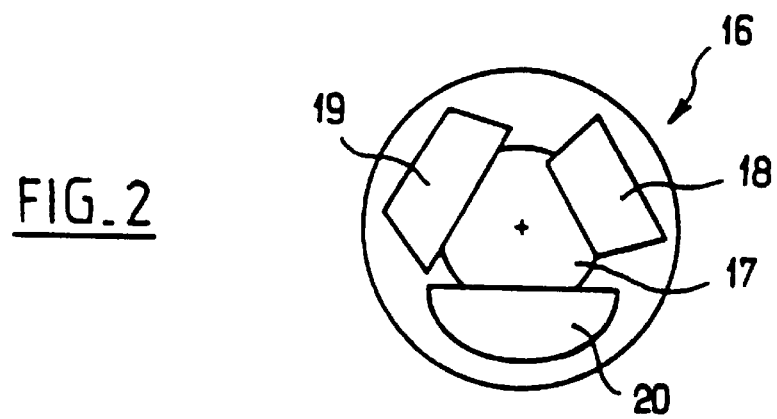
FIGS. 2 and 3 are schematic views of a three-mirror lens, respectively in front and profile view and modelled according to one embodiment of the invention.

FIG. 2 represents a three-mirror lens 16, of known type, consisting of a central spherical optical lens 17 and three plane mirrors with different inclinations, namely a mirror 18 inclined at 73° relative to the frontal plane, which makes it possible to observe the regions located around the fundus of eye, a mirror 19, inclined at 66°, which makes it possible to observe the peripheral regions of the eye, and a mirror 20, inclined at 59°, which makes it possible to observe the regions of the eye which are located around the iris.

The examination lens 16 therefore has three degrees of freedom, namely one degree of freedom about its axis of revolution and two degrees of freedom about the centre of the eye, or more precisely, about the centre of the cornea. The inventors have shown that the tilt angles of the mirrors 18, 19 and 20 about the eye are less than 27°, the examination lens 16 being, in contrast, capable of rotating through 360° about its axis.

Figure 3:
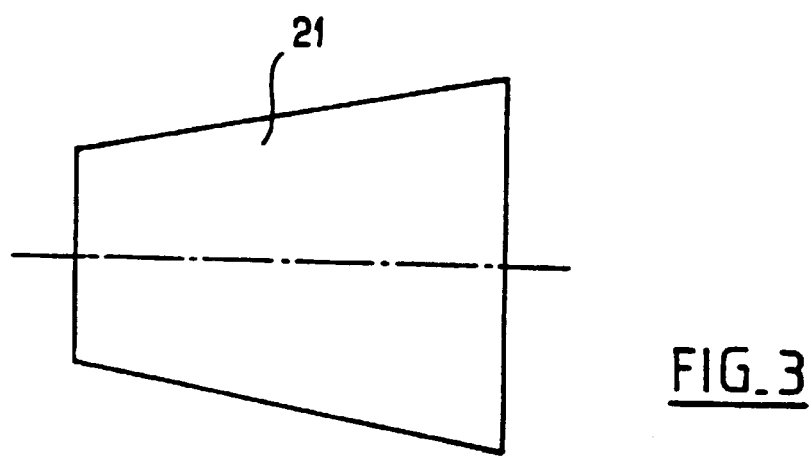

According to the embodiment of the invention more particularly described here, the three-mirror lens is mathematically modelled by a cone 21 (cf. FIG. 3) while approximating the spherical optical lens by a circle in a plane, and the three mirrors are modelled by three planes.

Each mirror 18, 19, 20 is therefore characterized by four points defining the edges, and a plane equation. The cornea is modelled by a hemisphere, for example of radius 7.7 mm, the centre of which is offset relative to that of the sphere of the eye, the axes of the corresponding frames always remaining the same.

In the database of the computer 8, the coordinates are therefore expressed in a frame centred on the centre of the sphere of the cornea, which has coordinates xo, yo, zo.

An initial position of the examination lens is furthermore fixed for describing the various coordinates.

The examination lens undergoes the same translations as the eye, but is displaced about the latter by means of three rotations, one about its axis and two about the eye.

These rotations will now be described below.

In the embodiment more particularly described here, the sensor chosen for modelling the three-mirror lens is an element referred to as a triple-rotation joystick because it allows absolute location of the position of the joystick 13.

The problem solved by this part of the invention actually consists in finding the position of the stick as a function of the data communicated by the joystick. The information is transcribed into polar coordinates after prior calibration of the joystick, the two rotations operating on the principle of spherical coordinates (see FIG. 4), by providing first a rotation about the Oy axis 22, then a rotation about the new ox axis 23, which has rotated because of the rotation about Oy.

FIG. 4 illustrates, respectively by lines of parallel 24 or by lines of longitude 25, the displacement of the joystick when one of the parameters (x or y) is constant.

These rotations are manifested in the form of a space transformation matrix, calculation of this matrix being therefore necessary in order to know the new position of the points of the mirrors and of the central lens, after the rotations.

The rotation matrix about the axis of revolution is given below.

$$M_\theta = \begin{pmatrix} \cos\theta & -\sin\theta & 0 & 0 \\ \sin\theta & \cos\theta & 0 & 0 \\ 0 & 0 & 1 & 0 \\ 0 & 0 & 0 & 1 \end{pmatrix}$$

The first rotation to be performed is then the one with axis Ox and angle $\phi$, which amounts to placing it at the correct latitude. The rotation with axis Oy and angle $\phi$ is then produced, this time placing it on the correct longitude.

The rotation matrix is given below:

$$M_{\gamma\psi} \begin{pmatrix} \cos\psi & \sin\varphi\sin\psi & \cos\varphi\sin\psi & 0 \\ 0 & \cos\varphi & -\sin\varphi & 0 \\ -\sin\psi & \sin\varphi\cos\psi & \cos\varphi\cos\psi & 0 \\ 0 & 0 & 0 & 1 \end{pmatrix}$$

The overall change-of-coordinate matrix, after all the rotations and the translation, is therefore given by the formula:

$$Mat = \begin{pmatrix} 1 & 0 & 0 & x_0 \\ 0 & 1 & 0 & y_0 \\ 0 & 0 & 1 & z_0 \\ 0 & 0 & 0 & 1 \end{pmatrix} \times M_{\varphi\psi} \times M_\theta$$

It is then sufficient to multiply this matrix by the coordinates (x;y;z;1) of a point M (of the simulated image), in the frame associated with the three-mirror lens, in order to obtain the coordinates (x';y';z';1) of the point M in the absolute frame:

$$\begin{pmatrix} x' \\ y' \\ z' \\ 1 \end{pmatrix} = Mat \times \begin{pmatrix} x \\ y \\ z \\ 1 \end{pmatrix}$$

Advantageously, this matrix is also used for determining the new equation of the planes of the mirrors. Indeed, in general, if Mat is the change-of-coordinate matrix, and if the plane is ax+by+cz+d=0, in the examination lens frame, then the new equation of the plane, in the absolute frame, is given by the formula a'x+b'y+c'z+d'=0, with:

$$\begin{pmatrix} a' \\ b' \\ c' \\ d' \end{pmatrix} = {}^t Mat^{-1} \times \begin{pmatrix} a \\ b \\ c \\ d \end{pmatrix}$$

Furthermore noting that the matrices $M_{\varphi\psi}$ and $M_\theta$ are orthogonal matrices (since they are composed of rotation), it follows that ${}^t M_{\varphi\psi} = M_{\varphi\psi}$ and ${}^t M_\theta = M_\theta$.

It can therefore be deduced therefrom that:

$$^tMat^{-1} = \begin{pmatrix} 1 & 0 & 0 & 0 \\ 0 & 1 & 0 & 0 \\ 0 & 0 & 1 & 0 \\ -xo & -yo & -zo & 1 \end{pmatrix} \times M_{\varphi\psi} \times M_\theta$$

The equation of the plane in the new frame makes it possible to find the images of the points in the mirror, that is to say the mirror image of the points relative to the plane. If $ax+by+c+d=0$ is the new normalized equation of the plane of the mirror, then the image M' of M is obtained by:

$$\begin{cases} x_{M'} = x_M - 2^*dist^*a \\ y_{M'} = y_M - 2^*dist^*b \\ z_{M'} = z_M - 2^*dist^*C \end{cases} \text{where } dist = ax + by + cz + d$$

A description will now be given of the general principles of the eye modelling employed in the embodiment of the invention more particularly described here, with reference to FIG. 5.

The eye is modelled by a sphere of centre 27, the iris being modelled by a flat ring 28, orthogonal to the optical axis 29 and defining the pupil 30. For its part, the cornea is defined by a second sphere 31, for example with a diameter of 10.8 mm, the centre of which is offset relative to that of the sphere.

By way of non-limiting example, the dimensions of a model which is adopted will be given below with reference to FIG. 5:

$a = 9$ mm  $d = 5.4$ mm $b = 12$ mm  $r = 12$ mm $c = 15.4$ mm  $e = 10.39$ mm

All the points of the eye are thus defined in a frame associated with the eye, the centre of this frame being the centre 27 of the sphere. The axes are furthermore defined as follows.

If the eye is viewed by an individual with the iris in front of him, the Ox axis 32 is horizontal and points to the right, the oy axis 33 points down and the Oz axis 34 points from the pupil 30 to the macula 35, in the direction of the optical axis.

A description will now be given of the process for creating the texture of the fundus of eye used in the invention.

Since the first application envisaged is laser photocoagulation, the choice has been made to use digitized photos of the fundus of eye.

The task of reconstructing the complete bottom of the eye from a plurality of digitized photos is therefore performed first.

This is described below with reference to FIGS. 6 and 7, FIG. 6 giving the position of the photos when they are taken, and FIG. 7 giving their position after projection onto the map.

The problem posed and solved by the invention is, in the case in point, to obtain a database of the human eye in the form of a map with polar coordinates $M_{\varphi\psi}$ and $M_\theta$ (see FIG. 7).

This is done using a set of twenty photographs per eye (D1 to D20 in FIGS. 6 and 7).

The mathematic solution adopted by the inventors here resorts to matrix calculation using rotation matrices and to rectangular projections, always performed according to the same axis.

In order to obtain correct alignment of the images, four degrees of freedom are adopted: the longitude ($\phi$), the latitude ($\theta$), the image rotation ($\nu$) and the separation($\chi$).

In order to fill the map of the bottom of the eye without leaving holes, the following are therefore carried out:

Scanning of all the points of the map in a window centred around the point M ($\phi$, $\theta$), which is the tangent point between the image plane and the sphere of the eye.

Computation in the image plane of the coordinates of the corresponding point, which is therefore equivalent to projecting the sphere to the plane.

Making a copy of the value of the light intensity of the red, green, blue (RGB) components associated with the said point.

Since operation takes place in real-time, or substantially in real-time, it is necessary to obtain a fast display.

To do this, only the points of the image plane are kept for display, while projecting the plane to the sphere.

The software employed for performing the steps described above is therefore designed to be interactive, in order to allow the displacement of the image in order to adjust it, before pasting into the map of the bottom of the eye.

The flowchart of the programme making it possible to paste the images back together is now described below with reference to FIG. 8.

The first step 40 is a step of graphics initialization, parameter initialization and opening the map of the bottom of the eye.

During operation (step 41), in succession, the map is displayed (step 42), then while there is an image (step 43), the name of the image file is input and the latter is read (step 44), which step is itself followed, during operation (step 45), if the operator is satisfied, by the step 46 of calculating the window defined before, then the step 47 carrying out the "paste" function and, if the operator gives his consent at 48, recording at 49 of the map of the bottom of the eye.

If the operator is not satisfied (step 50), the parameters $\phi$, $\theta$, $\nu$ and $\chi$ are then input at 51 before performing the step 52 which carries out the "project" function.

Once the programme for forming the bottom of the eye is ended, the step 53 for graphics closure and releasing the memory is then carried out.

The functions "project" and "paste" are described below in pseudocode.

Project: For every image point f($\chi$) sampling;

f($\nu$) plane rotation;

Plane-sphere projection;

f($\phi$, $\theta$) sphere rotation Spherical Cartesian transformation;

Display the image point value in the map;

EndFor

Paste: For every map point located in the window

Spherical Cartesian transformation;

f'($\phi$, $\theta$) inverse sphere rotation;

Sphere-plane projection;

f'($\nu$) inverse rotation;

f'($\chi$) inverse sampling;

Read image point value;

EndFor

Figure 8:
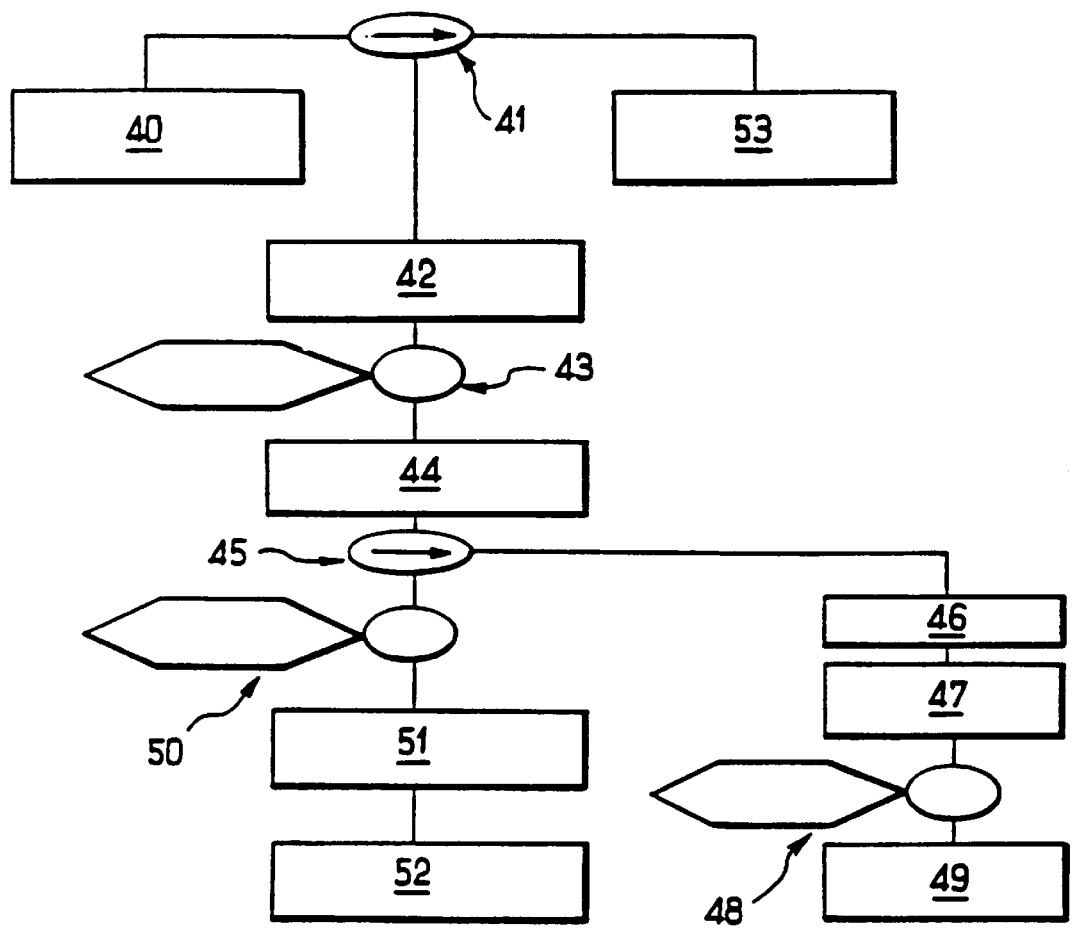
FIG. 8 is a flowchart giving the image repasting steps for obtaining a fundus of eye.

The programme proper for creating the texture of the fundus of eye is described again more precisely, with reference to FIGS. 8, 9, 9' and 10.

The size of the database used is first, for example, fixed at 1024 by 1024 pixels, so as to reach a good compromise between the quality of the image produced, the memory occupied and the processing time.

Compilation is furthermore carried out with true colours, reduction to false colours taking place after compilation.

The format of the image is a so-called bitmap format, for example the format known under the name Targa, the MS-DOS extension of which is denoted by the abbreviation TGA.

In the embodiment of the invention more particularly described here, the solution employed for digitization is the transfer of the photos onto Kodak Photo CD™. The digital images provided are thus of excellent quality with low digitization cost. The same image is reproduced in five different formats on the CD-ROM storage disk, namely 3076×2048 pixels, 1536×1024 pixels, 768×512 pixels (the format employed for the final compilation), 384×256 pixels and, finally, 192×128 pixels.

The programme runs in two separate phases.

The first phase (see FIG. 9A) is used for estimating the parameters $\phi$, $\theta$, $\nu$ and $\chi$. It is, for example, supervised by the operator, but may also be automatic.

The programme computes the coordinate changes in the direction 54 from the image 55 to the map 56, as indicated in FIG. 9A.

The operator initializes the parameters $\phi$, $\theta$, $\nu$ and $\chi$. For $\phi$ and $\theta$, the values are approximately known if the photographer has denoted the references when taking the picture. $\theta$ is of the order of 40° for the first ring and of the order of 80° for the second ring.

Since the angle $\phi$ is generally denoted in hours, the following conversion is simply carried out: one hour=30°.

For the angle $\nu$, all the values from 0° to 360° are a priori possible, the method then being used being to test a value at random and to visualize a first result, then search for the proper value by repeated trial and error.

Finally, for the angle $\chi$, the value of about 40° was determined by measuring the diameter of the optic nerve. Knowing that an optic nerve measures approximately 1.5 mm in diameter, the number of pixels is counted in order to calculate the distance between two separated pixels and thus find the mean value of the sampling to be applied.

For each point in the image, the programme then computes $f(\phi, \theta, \nu, \chi)$ in order to obtain a point in the map, then illuminates this point on the computer screen used with the colour of the image point (step 42).

The operator then visually checks the continuity between photographs on the screen (step 45).

If the operator is dissatisfied with the results (steps 50 to 52), he changes the values of $\phi$, $\theta$, $\nu$ and $\chi$ and the calculations and the display are reiterated (cf. description above).

As soon as the operator is satisfied, he triggers the second phase (steps 46 to 49) (see also FIG. 9B).

The second phase carries out compilation. It operates automatically.

The programme computes the coordinate changes in the direction 57 from the map 56 to the image 55, as indicated in FIG. 9B.

The programme then defines a window (step 47) around the point in the map of the bottom of the eye with coordinates $\phi$, $\theta$ estimated previously.

For all the points in this window, the programme computes $f(\phi, \theta, \nu, \chi)$ in order to obtain a point in the image.

The programme copies, into this point in the map of the bottom of the eye, the colour of the closest image point.

It should be noted that when all the points in the map are read, two points located on the same parallel will have the same projection onto the plane, but only one is the result of the projection of the plane onto the sphere. It is the point closest to the tangent point which should be taken into consideration, as illustrated in FIG. 10, where the points M and N are actually both projected to A, but where only the point N should be retained.

Furthermore, only one window around the tangent point is scanned (rather than the entire sphere). The size of this window can vary as a function of the value of the angle $\theta$. It is clear that all the $\phi$ angles must be scanned when in proximity to the pole. In contrast, when away from the pole, the window to be scanned in $\phi$ angles may be reduced.

The method used for superimposing textures on the fundus of eye, that is to say fitting juxtaposed pieces of images on a substantially spherical background, will now be described.

To do this, a decision is made to present the surface of the sphere in the form of facets, or to "facet" the sphere and then give a texture to each facet, or to texture each facet.

The facetting may be fairly coarse or fairly fine. The finer it is, the more facets there are to be processed, although the display method remains identical. Only the processing time is then longer, without the display time being, for its part, modified at all. The method does not therefore depend on the number of facets used.

One essential condition for the facetting is that the facetted object encloses the sphere. This is because, as the interior of the sphere is being viewed, if there are volumes outside the facetted object, then regions of the screen will no longer be textured for "grazing" viewing angles.

The particular case of facetting by an icosahedron will be detailed below. Recall that an icosahedron is composed of 20 equilateral triangles.

The texture is then encoded as follows. A number is first fixed for each facet. The textures are then encoded in triangles placed end-to-end in increasing order. The structure obtained can then be inserted into a two-dimensional table (see FIG. 11).

In the embodiment more particularly described here, a 512 byte value is assigned to each side 57 and an identical 512 byte value is assigned to each triangle height 58. The table therefore has 512×512×20/2 i.e. 2621440 bytes, one colour being encoded over one byte. The colour of a point in the facet is then obtained by projecting this point to the centre of the sphere and by recovering the colour of that point in the sphere which is encountered (conical projection of the centre of the sphere).

To illustrate the above description, assume that a region appears on the screen which needs to be textured; it is, for example, the region in which the fundus of eye is seen.

The following procedure is then adopted for each facet.

The facet is first eliminated if it is incorrectly oriented. Otherwise, this facet is projected to the screen, it is superposed with the region in which the fundus of eye is seen and the polygon obtained is cut into triangles which are textured one after the other, for example by using the polygon cutting technique which will be described further on.

For the texture, a double linear interpolation is, for example, carried out (see FIG. 12), that is to say that, for each vertex of the triangle 59, the pairs (u, v) are computed then u and v are interpolated along a side of the triangle (arrow 60), then horizontal interpolation is carried out from each point on the said side (arrow 61).

The triangle is thus gridded in two passes, to give an upper triangle (62) and a lower triangle (63).

The double-interpolation method has the advantage of being fast. It can in fact be written incrementally, that is to say that it only uses integers. For each pixel, only two additions and two tests are thus used.

The double-interpolation method does not, however, take into account the deformation due to the effect of perspective, but this does not prove to be a problem since the facets are almost parallel to the plane of the screen.

However, facetting the sphere of the eye does have drawbacks. This is because, although the facetting method guarantees continuity $C_0$ in the texture, it does not guarantee continuity $C_1$ on the edges of two facets. This is not a problem in the general case, except if a blood vessel passes from one facet to another. In this case, a discontinuity in the tangent is observed at the interface.

In the embodiment of the invention more particularly described here, provision is also made to generate software smoothing in real-time.

To do this, a number of exactly computed smoothing levels are decided on. To calculate the smoothing for each pixel, the colours of the points in a square region located around the pixel in question are averaged. The size of the region then defines the greater or lesser smoothing level adopted.

Three smoothing levels are therefore, for example, precomputed and the texture is created for each level. This gives four textures of the fundus of eye, a sharp texture and three smooth textures.

When the bottom of the eye is plotted, the colour of the pixel is obtained by linearly interpolating between two consecutive levels from the four versions of the texture.

By way of example, ten intermediate stages between two computed smoothing levels will be considered, that is to say a parameter a varying from 0 to 0.9 in steps of 0.1. The colour of the pixel is therefore obtained by the following formula:

$$C=C_2+\alpha+C_1+(1-\alpha)$$

where $C_1$ is the colour of the pixel in the least smooth texture and $C_2$ the one in the smoothest texture.

In order to avoid having to compute C in real-time, this formula is furthermore precomputed.

It is thus possible, when working with 256 colours, for each value of $\alpha$ to put the value of C (or rather its approximation in the colour palette) in a table whose entries are $C_1$ and $C_2$. The size of the table obtained is 256×256×10, because there are ten values for $\alpha$.

The operation can furthermore be optimized. Thus, for a pixel, a so-called long value (32 bits) is obtained which corresponds to four values with 8 bits each, representing the four colours of the pixel at each smoothing level. These values are ranked in increasing order of smoothing.

A shift operation is then carried out, then a mask is applied in order to obtain the binary concatenation $C_1C_2$. Knowing where the table starts for a given $\alpha$, the value of C is then obtained directly by reading from the start+$C_1C_2$ memory location.

In true colour, the conversion is even simpler and more exact. If each component is encoded over n bits, a table of the n×n×10 type is employed. This table is valid for all the components, but requires three memory accesses (one per component) to reconstruct the colour.

A set of programmes furthermore makes it possible to create the database for the texture.

The input data are in this case four bitmap files representing four levels of smoothing. These files are in fact (θ, φ) maps of the eye, the poles being the points on the optical axis. These files are, for example, in the .BMP format (of the interface known by the term Windows 3.x) with 256 colours and a size of 1024×1024, and have the same palette. They are numbered 1 to 4.

A first programme first makes it possible to obtain, on the one hand, a PAL palette file giving, for the colours from 0 to 255, the value of the RGB triplet with 8 bits each. It then generates four .TEX files representing each bitmap, starting from the top-left point. These files have no header.

Another programme furthermore generates the texture associated with each triangle and thus creates four .TXU files. These files are the tables described in FIG. 11.

This can be summarized as follows:

$$\left.\begin{array}{l}\text{Name1.BMP}\\\text{Name2.BMP}\\\text{Name3.BMP}\\\text{Name4.BMP}\end{array}\right\} \Rightarrow \left\{\begin{array}{l}\text{Name.PAL}\\\text{Name1.TEX}\\\text{Name2.TEX}\\\text{Name3.TEX}\\\text{Name4.TEX}\end{array}\right\} \Rightarrow \left\{\begin{array}{l}\text{Name.PAL}\\\text{Name1.TXU}\\\text{Name2.TXU}\\\text{Name3.TXU}\\\text{Name4.TXU}\end{array}\right.$$

The simulation software proper will now be described, starting with the modelling of the operation.

The modelling is greatly dependent on the rendering algorithm used. The methods commonly used in image synthesis include the methods referred to as ray tracing and geometrical rendering. Ray tracing requires prohibitive computation time if it is desired to produce animations in real-time. Geometrical rendering consists in cutting each surface of the scene into triangles, in sorting the surfaces or in using an algorithm of the type referred to by the term Z-buffer. It requires specialized machines.

With the invention, the method used is independent of the machine with which it is implemented. To do this, a choice is made to model each object in simple fashion and display it with an invariant order, which makes any sorting superfluous. The simulation device is, for example, installed on a 66 MHz 486DX2 PC with a graphics card of the Local Bus type, which is found to be the minimum current configuration for operating the simulation device interactively.

To model the slit lamp and therefore model the scene (see FIG. 13), it is appropriate to have an absolute Ox, Oy, Oz frame (70) in which all the coordinates are expressed. This frame is placed fictitiously at the centre of the eye of the operator, who for this purpose is assumed to use only one eye (whereas in reality he uses a binocular).

The Ox axis points to the operator's right, the Oy axis downwards and the Oz axis from the operator to the patient.

In reality, the patient's eye remains stationary and it is the slit lamp which moves, with the operator performing the same movements. In the model according to the invention, the situation is the opposite, that is to say it is the operator and the slit lamp which remain stationary and the patient's eye which has its movement simulated.

The centre 71 of the eye is first located at the point with coordinates (x'o, y'o, z'o) in the global frame defined above (axes 32, 33, 34 in FIG. 5).

The variations in these parameters signify translations of the system.

For its part, the slit lamp is characterized by the light which it emits towards the patient. The changes in illumination power are modelled by making brighter or darker the rectangular part or region of the eye illuminated by the lamp.

Next, as regards the modelling of the laser, recall that there is in fact a mirror with two degrees of freedom which makes it possible to orient the laser radiation relative to the eye. The angles of rotation, respectively about Oy and Ox, are called $\xi$ and $\zeta$. The rest position is reached when the mirror is vertical, that is to say when its normal has coordinates (0;0;1) in the Ox, Oy, Oz frame. After the two rotations, the new normal is N(sinζcosξ;–sinξ;cosζcosξ). The incident ray is then modelled by a straight line with director vector I(0,1,0). For its part, the reflected ray is R=I–2(N.I)N.

Since the impact spot of the laser radiation on the mirror always lies on the axis of rotation Oy, it has the following coordinates in a frame associated with the mirror (the centre being the intersection of the two axes of rotation):

$$0; -\frac{d}{\sin\xi}; 0$$

where d is the distance from this centre to the mirror.

Using the same procedure, the possible reflection of the radiation on one of the mirrors of the examination lens is then computed.

For the three mirrors 15, 16, 17, the intersection M between the plane and the straight line modelling the laser is then determined. Whether or not M lies inside the mirror is then checked using an algorithm employing vector products.

Let the set of corners of the mirror, with $M_0=M_n$, be oriented in the trigonometric sense, and let N be the normal to the plane. Since the mirror is convex, the following property follows:

$$M \text{ lies outside } \Leftrightarrow \exists i, (\overrightarrow{MM_i} \wedge \overrightarrow{MM_{i+1}}).\vec{N} < 0$$

The intersection between the direct or reflected ray and the sphere of the eye is then computed.

A description will now be given of the visualization algorithm employed in the embodiment of the invention more particularly described here.

The central lens is first drawn on the screen, followed by the observer's view through the lens. The mirrors are then plotted one by one, using a loop, by drawing the image of the central lens in the mirror and that part of the eye seen in this image. Indeed, the parts of the eye seen in the mirror are observed through the central lens.

The objects to be plotted are as follows:

Central lens and its surround;

Iris;

Texture of the fundus of eye of the central optical lens;

Impact spot of the laser radiation laser spot;

Mirrors;

Views of the central lens;

Images of the iris in the mirrors;

Images of the bottom of the eye in the mirrors;

Images of the laser spot in the mirrors;

Plot of the reflection of the laser spot from the mirror;

Modification of the colours of the part illuminated by the slit lamp.

The set of objects to be plotted is schematized in the image or "screen capture" 80, represented in FIG. 14. This screen capture does not, however, show the textures of the fundus of eye which are employed and is used only for positioning each element.

The band 81 represents the luminous slit emitted by the slit lamp onto the fundus of eye 82. The circle section 83 embodies the edge of the central lens 14, the outer grey ring 84 representing the iris, and the central inner circle 85 embodying the macula.

The veins 86 and the arteries 87, as well as the optic nerve 88, are also represented.

The central lens 89 is surrounded by the images of the three mirrors distributed angularly at 120°, namely the medium-periphery mirror 90, the small-periphery mirror 91 and the large-periphery mirror 92.

FIG. 15 more precisely illustrates a view in one of the mirrors. The bottom of the eye 93 is seen in the intersection of the image of the pupil, the image of the central lens and the mirror.

FIG. 15 also shows the impacts 94. These are the bright points scattered in the bottom of the view. The disk 95 located on the left of the slit 96 corresponds to the reflection from the mirror.

The polygon cutting mentioned above will now be described more precisely with reference to FIG. 16.

Some objects should, for example, be drawn only in other objects. For example, the iris is seen through the central lens. Only the part of the iris lying in the lens should therefore be plotted.

The set of objects to be plotted are defined using polygons: the circles for the edge of the optical lens, for the edge of the frontal lens, the mirrors, the iris, the slit, etc. They appear on the screen in the form of closed polygonal contours. These polygons are therefore employed for delimiting the regions to be plotted. For example, the iris polygon is cut by the polygon of the central optical lens. The algorithm used is the Sutherland-Hodgman algorithm (see FIG. 16).

The polygons 97 and 98 are assumed to be convex and oriented in the trigonometric sense. For each segment 99 of the cutting polygon 98, that part 100 of the polygon 97 lying on the outside of the segment is eliminated. This algorithm functions best with real numbers, whence the general structure of the segments which is used. By way of example, one table gives below the number of vertices and one table gives the coordinates of the vertices.

```
structPOINT_2D
{
    real x;y;
};
int nvertices;
structPOINT_2D vertex[nvertices].
```

Since the cutting of two correctly oriented convex polygons gives a correctly oriented convex polygon, the cutting obtained can then itself be used as a cutting polygon.

The various steps in the algorithm for plotting the image will now be detailed.

This algorithm comprises the main algorithm 101 (see FIG. 17).

For implementing it in the embodiment more particularly described here, use is made of a double or triple buffer memory in order to create the animation with a visible screen different from the plotted screen. The algorithm 101 comprises a first step 102 of initializing the screen, a second step 103 of acquiring the parameters through the sensors, a third step 104 of precomputing the view which will be detailed below, and a fourth step 105 of erasing the plotted screen. The following step 106 (see also below) of plotting (matrices, identification of the impact spot of the guide, etc.) is then carried out before a step 107 of inverting the plot and visualization. The procedure is reiterated as many times as necessary (arrow 108).

Note furthermore that, in the embodiment of the invention more particularly described here, when a laser shot is fired, the image is not plotted, in order to take into account the dazzling. The fact that a view has not been plotted therefore makes it possible to integrate the impacts into the texture during the dead time.

In order to simulate the dazzling properly, it is furthermore necessary for the colours to then appear only progressively after the shots. This means that the operator must be able to continue to operate without a new view being displayed, in order to correspond to reality.

During continuous bursts of shots, the images will therefore no longer be plotted. In contrast, the precomputations continue to be made in order to define the location of the impacts and to integrate them into the texture.

This method thus makes it possible to produce bursts very quickly, without being limited by the frequency of the image generation. After a given time, a counter will need to make it possible to redisplay the images, with the intensity of the colours increasing progressively, by acting on the palette.

The programme trees of the algorithms which will now be describe correspond to FIGS. 18 to 23.

In these trees, the parts surrounded by bold lines denote procedure calls constituting the subject of a different programme tree.

The first algorithm corresponding to step 104 defined above, is the precomputation algorithm. This algorithm (see FIG. 18) describes a routine intended to perform all the computations not depending on the plot.

It is necessary when laser shots are fired in bursts. This is because, as has been seen, in these cases it is necessary to continue performing the computations of the impact spot without generating a view.

The computations performed are essentially matrix computations or intersection computations. The last part consists of computing the cutting polygons, namely the frontal lens and the region illuminated by the slit lamp, these polygons being furthermore restricted to the screen, which consequently makes it possible to avoid having to make screen membership tests for everything which is to be plotted.

More precisely, this algorithm carries out the following sequentially (200):

computation of the transformation matrix of the three-mirror lens (201), computation of the direction of the laser radiation (202), computation of the parameters of the three-mirror lens (203), computation of the new position of the points of the eye (204), computation of the normals to each facet (205), the branch 206 which, for each mirror (Mi), if the laser is reflected from the mirror (207) and if, after reflection, the laser passes through the central lens and the iris (208), leads to computation (209) of the impact on the eye, the branch 210 which, if the laser is not reflected (211) and if the laser passes through the central lens and the iris (212), leads to computation (213) of the impact on the eye, and, finally, the computation of the cutting polygons (214).

For its part, the computation of the parameters of the three-mirror lens (203) takes place sequentially as a function of the position of the central optical lens (215) and, for each mirror (Mi), comprises the sequential operations 216 of computing the vertices (217), computing the normal (218) and computing the image of the origin in the mirror (219).

The general principle of the plotting algorithm corresponds to step 106 which will now be described.

Since the object is always to be plotted in a given region, it is therefore restricted to this region, it is plotted and the region in which it is necessary to draw the following object is then defined.

Thus, if the central lens is invisible, then nothing is visible and the programme stops. Otherwise, the edge of the lens must be plotted in the region covered by the frontal lens, and so on.

To do this, use is made of the routine for cutting polygons described above. It should, however, be noted that the iris and the bottom of the eye are plotted at the intersection of the central optical lens and of the pupil, respectively, with the region illuminated by the slit lamp.

For the iris, determination of the cutting polygon will thus be more complex since it is the intersection of the illuminated region and of the cut central optical lens.

This is, however, not so for the bottom of the eye because the programme then uses the cutting polygon of the iris, itself cut by the illuminated region.

Plotting step 106 will now be detailed by describing the algorithm 300 with reference to FIG. 19.

If the frontal lens is visible (301), then the following operations are then carried out sequentially (302);

plotting the frontal edge of the frontal lens (303);

plotting the edge of the central optical lens (304);

if the central optical lens is visible (305), then the iris (306) is sequentially plotted, and if the pupil (307) is visible, the bottom of the eye is sequentially plotted (step 308 detailed below); if the laser touches the bottom of the eye (309) and if the laser is visible (310), then the laser guide (311) is plotted;

for each mirror (312), the contour of the mirror (313) is sequentially plotted, and if the image of the central optical lens is visible (314), the image of the iris (315) is sequentially plotted, and if the pupil is visible in the mirror (316), the image of the bottom of the eye is sequentially plotted (step 317), and if the laser touches the bottom of the eye (318) and if the image of the guide is visible (319), the laser guide (320) is plotted;

finally, if the laser is reflected in a mirror (321), the reflection of the laser is plotted (322).

The plots of the fundus of eye (step 308) seen directly or seen through the mirror (step 317) are substantially identical.

In the case of plotting the fundus of eye through the mirror, it is simply necessary to compute the image of the icosahedron in the mirror. Since the orientation is inverted, account is taken of the computation of the orientations of the faces, and the order of the points is inverted in order to keep them in the trigonometric sense.

The facets are eliminated if they are poorly oriented, otherwise they are cut with the cutting polygon of the illuminated pupil. With the same routine, the functions given in the parameters u and v of the texture are computed. Since these parameters are linear, the following relationships exist for a point (x, y) on the screen;

$$u(x, y) = \alpha_u x + \beta_u Y + \gamma_u$$

$$v(x, y) = \alpha_v x + \beta_v y + \gamma_v$$

The value of the parameters of the two functions are then determined by placing the values of the textures (which are known and correspond to the indices in the texture table) at the vertex of the triangles. For reasons associated with reading reliably from the texture table, a wider triangle is defined for computing the parameters by applying a homothetic transformation from the centroid of the triangle.

The polygon to be textured which is then obtained is the cut triangle. It is therefore no longer in general a triangle. The centroid of this polygon is then used to cut it into elementary sub-triangles. By virtue of the functions computed above, the value of the parameters u and v at the vertices of the sub-triangles are then computed and the sub-triangle is displayed on the screen.

For each of the sub-triangles, the texture is interpolated bilinearly. In order to generate the smoothing, interpolation is carried out between two smoothing levels precomputed in exactly the same way as described above.

More precisely, FIG. 20 shows the step 308 for plotting the fundus of eye (400).

Figure 22:
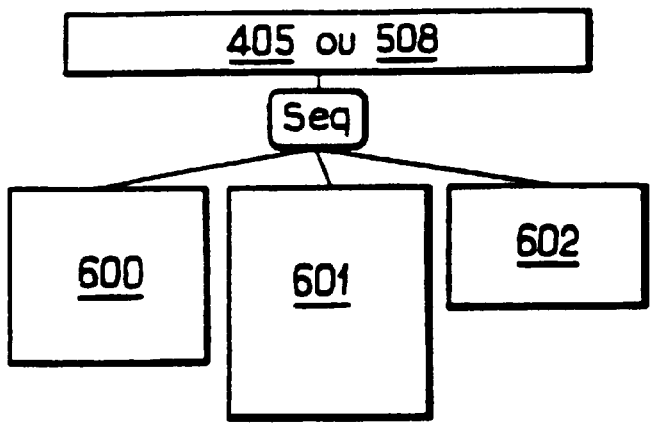
Figure 23:
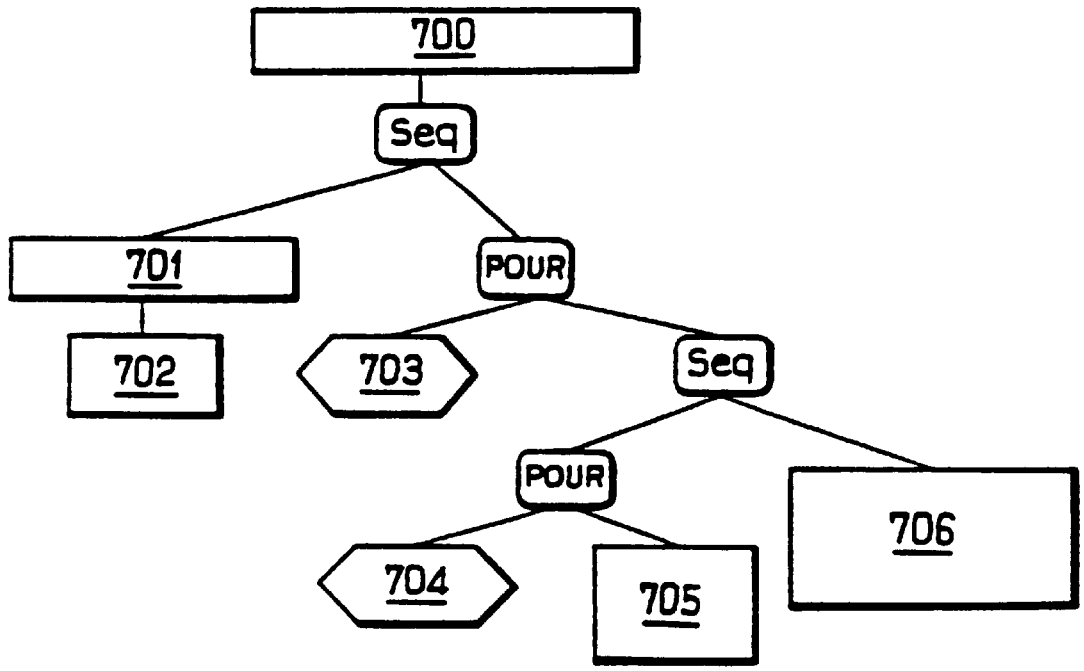

For each facet (401), if the facet is correctly oriented (402), sequentially (403), the projection of the facet is computed at (404) and the facet (405) is plotted, the latter step being detailed with reference to FIG. 22.

FIG. 21 shows the step 317 of plotting the bottom of the eye in a mirror (500).

The following are carried out sequentially:

for each point of the icosahedron (501) the image of the point is computed (502), for each facet (503), the normal to the image of the facet is computed (504), for each facet (505), if the image of the facet is correctly oriented (506), the projection of the image of the facet (507) is sequentially computed and the image of the facet (508) is plotted, this being identical to the plotting in direct view (405).

The plots (405) or (508) of a facet which are described with reference to FIG. 22, consist in sequentially performing the following operations:

cutting the projected triangle and determining the part to be displayed (600), computing the centroid, enlargement and computation of the equations of the texture parameters (601), and displaying the visible part of the facet (602).

For its part, the displaying (700) of a cut facet (see FIG. 23) consists in sequentially cutting into triangles 701, then computing the centroid (702) then, for each triangle (703), sequentially for the three vertices (704), the texture parameters (705) are computed and the triangle is displayed with bilinear interpolation of the texture and interpolation of the smoothing (706).

As regards plotting the central lens, the latter is modelled by a circle.

Three points are therefore considered: the centre C and two orthogonal radii A and B. The new coordinates of C, A and B are computed using the matrix Mat computed previously. The polygon whose vertices are the projections of the following points is then filled in on the screen, in the colour of the fundus of eye $$M(\theta)-c+\cos\theta A+\sin\theta B.$$

A choice is, for example, made to plot with 30 points.

For its part, the edge of the lens is represented by a ring. It is processed by considering the space contained between the two polygonalized circles. The two circles are identified and cut separately, the two cut polygons being then reconstructed by adding the connection between the two.

Since the iris is also a ring, the plotting method is identical, only with a translation computation being performed in this case (Mat describes the movements of the lens, not of the eye).

In summary, the polygon defined by the central circle of the iris and cut by the edge of the optical lens, possibly by the edge of a mirror and by the edge of the frontal lens, defines the region of the fundus of eye to be textured.

As regards plotting the laser radiation, there are two possible cases to be considered. Either the laser radiation arrives directly on the lens or it passes through one of the mirrors of the lens. In both cases, the location of the spot on the fundus of eye is obtained. During plotting, Boolean algorithms indicate, in a manner well within the scope of the person skilled in the art, whether, on the one hand, intersection takes place with the fundus of eye and whether, on the other hand, the laser radiation has been reflected beforehand by the mirror.

Thus, during the different plots, a test is done as to whether the laser spot is in the region, as for all the other objects of the fundus of eye. This operation makes it possible to display the spot on all the views: it is in fact possible for the spot to be seen both in a mirror and in the central lens at the same time.

If reflection from a mirror takes place, the plot of this reflection is also displayed. This is difficult to see at normal times, but is very clear to see during a shot.

In order to give the spot a "translucent" appearance, the choice is advantageously made to draw it with a gridded pattern. Thus, one point in two is displayed with the colour of the spot, the other points being unmodified.

The impacts are, on the one hand, stored in memory for evaluation and, on the other hand, stored in the texture for display.

In the embodiment more particularly described here, applied to teaching, two PC compatible microcomputers connected by an Ethernet network are used.

The first is a model of the DX2-66 type, equipped with a Local Bus graphics card whose output is duplicated on two or three separate screens (one or two miniaturized screens, for example of the type manufactured by the company Hitachi under the reference EVF VMH 39E, for viewing in the binocular, and one screen for monitoring by the expert).

Working under the operating system known by the term MS-DOS, it controls the operation of the programmes of the simulation device.

The second computer interfaces with the user through the teaching-aid software. Working under the graphical user interface known by the term Windows, of the US company Microsoft, it supervises the first computer and transfers to it the parameters specific to a particular running of the session. It thereby manages the databases associated with the device.

Many applications can be envisaged with the device according to the invention.

In its first use, the simulation device is dedicated to teaching the photocoagulation of lesions of the fundus of eye. It will therefore make it possible to teach the abnormalities of the fundus of eye which may benefit from this laser treatment.

A phase for recognizing the abnormalities present is carried out first. This is a phase for presenting various normal or abnormal situations. This step can furthermore be used in teaching vitreoretinal pathology without necessarily proceeding to the photocoagulation step.

Once the fundus of eye has been analysed, the second phase is the phase for treating the abnormalities. Any type of pathology which can be treated with laser photocoagulation may be simulated, namely diabetic retinopathy, occlusion of the veins, abnormalities of the retinal periphery (blurred vision, depigmentation, holes, tearing, etc.) age-related exuditive macular degeneration (abbreviated to ARMD) etc.

All the parameters of the photocoagulation are then simulated in their programmes, as are their effects on the retina (time, diameter, power), such as overdosing, underdosing, timing errors, incorrect location, diameter errors, scarring effects of the laser spots, etc.

Furthermore, the invention can also be used for evaluating the photocoagulation session.

The expert in charge determines the correct action, that is to say the correct photocoagulation parameters and the abnormalities which are to be treated. He may, if desired, use a library of standard cases.

This reference base is used for evaluating the laser session. The teaching progresses in steps or levels which it is necessary to validate before proceeding to the next one. Each session can be reviewed and the expert in charge can explain any possible errors.

The invention also makes it possible to prepare for a difficult operation.

The importance and necessity of results during a photocoagulation session demand perfect control of the parameters of the laser. However, the response of the abnormality to the treatment is sometimes insufficient or unpredicted (example of neovascular membranes in ARDM).

It would therefore be desirable to be able to predict the effect of the photocoagulation. This is the idea of "preparation for a difficult operation". On the basis of digitization of the fundus of eye which is actually to be treated, a "pre-treatment" is carried out with those parameters which are considered to be best suited. The simulator then displays the result of the laser. Another possibility is to request the parameters which are most effective for this abnormality, the equipment then being used as an "expert aid".

As regards optimizing the photocoagulation, recall that the purpose of the photocoagulation is to provide the most effective possible treatment with the minimum of detrimental effects. On the basis of a calorimetric analysis of the bottom of the eye to be treated, it will be possible to determine the maximum and minimum thresholds for the laser spots as a function of their size and exposure time. This will avoid the currently required phase of progressively increasing the power.

The device and the method according to the invention are furthermore excellent teaching tools. They allow projection into the binocular of the entire ophthalmological semeiology, and in particular the eyelids, the anterior segment simulating conjunctivitis, the cornea, the anterior chamber, the iridocorneal angle, the lens of the eye, the iris and the posterior segment (vitreous humour, retina, optic nerve, etc.).

All pathologies of the eye can therefore be taught using this means, for example corneal distrophies, glaucoma, cataracts, tumours, etc.

As is readily apparent, and as emerges from the above description, the present invention is not limited to the embodiments more particularly described here. Instead, it encompasses all variants thereof, in particular those in which the organ examined or treated using a binocular relates to a field other than that of ophthalmology, such as neurosurgery, ENT, obstetrics or coelioscopy, in so far as the structural modifications to be made in the context of these applications are within the scope of the person skilled in the art.

We claim:

1. A device (1) for simulating a procedure on a simulated organ by an operator, which simulated organ is generated using at least one digitized photograph, comprising:
   a binocular (3), for observing the organ and fitted with a control stage system (4) actuated manually by the operator, said system being designed to displace the binocular in an orthonormal triaxial frame Ox, Oy, Oz;
   wherein said device further comprises: a simulation means, including means for synthesizing a computer image of the simulated organ, wherein said simulation means comprises:
   means (8) for simulating a slit lamp and means (15) for simulating means for adjusting the dimensioning of said slit lamp which illuminates the organ;
   means (8) for simulating magnifying optics;
   one or two miniaturized video screens integral with the binocular;
   computation means (8) which generates a video image of the simulated organ to be examined and projects said image onto said miniaturized video screen or screens; and
   means for simulating a lens (16), for examining the organ, that is fitted with means (12) for manual actuation by an operator, which are designed to simulate the relative displacement of said simulated examination lens relative to said video image;
   wherein said simulation means and said computation means are designed so that the changing by the operator of any one of the parameters relating to the displacement of the binocular, to the adjustment of the slit lamp, to the magnification or to the examination lens modifies the video image of the simulated organ in real-time.

2. The device according to claim 1, further comprising means for simulating a laser radiation, including a mobile control element actuated by the operator, and means for simulating the impact of said laser radiation on the organ when the operator acts on said mobile control element.

3. The device according to claim 2, wherein the means for simulating the laser radiation include means to simulate the size of the impact spot, and the intensity and the duration of said radiation, the mobile control element comprising means for adjusting the position of the impact spot on the video image of the simulated organ, said adjustment means comprising a micromanipulator designed to act on a simulated deflection mirror that can move about two perpendicular axes.

4. The device according to claim 1, wherein the means for simulating the slit lamp comprise means for simulating the height and the width of the slit, and means for simulating the power of the lamp.

5. The device according to claim 1, wherein the simulation means include a set of potentiometric sensors designed to encode the information describing said parameters or to transmit the information to said computation means.

6. The device according to claim 1, further comprising a single sensor consisting of a triaxial potentiometric system designed to register entirely in a reference frame, the absolute angular position of said manual actuation means which is designed to simulate the relative displacement of the examination lens relative to the video image of the organ.

7. The device according to claim 1, further comprising means for recording the performance of the simulated procedure on the organ.

8. The device according to claim 1, wherein the organ of which the synthesis means supply a computer image is a fundus of eye and wherein the simulated examination lens is a lens with three mirrors whose movements are described by three rotations, one about its axis of revolution and the other two about the center of the cornea of the eye whose fundus is simulated, respectively in a horizontal plane and in a vertical plane, the spherical optical lens being modelled by a circle in one plane and the three mirrors by three planes.

9. The device according to claim 1, wherein the computation means which generates a video image of the simulated fundus of eye to be examined is designed to generate such an image from the at least one digitized photograph, the eye model used being a sphere cut into facets, the iris of which is modelled by a flat ring.

10. The device according to claim 1, wherein the computation means which generates a video image of the eye is designed to reconstruct a complete image of the eye from a plurality of digitized photographs, by juxtaposing said photographs edge-to-edge while attempting to respect the continuity of the blood vessels.

11. A method for simulating a procedure on a simulated organ by an operator, which simulated organ is generated using at least one digitized photograph, said operator using a binocular, for observing the organ, which is fitted with a manually actuated control stage system and designed to displace the binocular in an orthonormal triaxial frame Ox, Oy, Oz, comprising:

simulating by computation the presence of a slit lamp and the dimensioning of said slit lamp;

simulating by computation magnifying optics;

generating by computation a video image of the simulated organ to be examined wherein said image is projected onto a miniaturized video screen integral with the binocular;

simulating by computation a lens for examining the simulated organ and the relative displacement of said simulated examination lens relative to said video image is simulated by actuation of a manual control by the operator, said simulations being designed so that the changing of any one of the parameters relating to the displacement of the binocular, to the adjustment of the slit lamp, to the magnification or to the examination lens modifies the video image of the simulated organ in real-time.

12. The method according to claim 11, further comprising the steps of simulating a laser radiation by computation, wherein the simulated operation and displacement are actuated by the operator acting on a mobile control element; and simulating by computation the impact of said laser radiation on the organ when the operator acts on said mobile control element.

13. The method according to claim 12, wherein during the simulation of the laser radiation, the size of the impact spot of said radiation, and its intensity and its duration are simulated by computation and the position of the impact spot on the video image of the simulated organ is adjusted by actuation on a micromanipulator designed to act on a simulated deflection mirror which can move about two perpendicular axes.

14. The method according to claim 12, wherein the impact of the laser radiation is integrated in a simulated video image, without plotting said image on the screen during a shot, and the dazzling observed after a laser shot is simulated by making the colors of the organ of said simulated video image reappear progressively.

15. The method according to claim 11, wherein during the simulation of the slit lamp, the height and the width of the slit and the power of the lamp are simulated.

16. The method according to claim 11, wherein the information describing said parameters is encoded by a set of sensors and is transmitted to the computation means, generating the video image of the simulated organ, which can project said simulated image onto said miniaturized screen integral with the binocular while modifying said image in real-time as a function of said parameters.

17. The method according to claim 11 wherein, to generate the video image of the simulated organ to be examined from an image data file relating to the organ, the method further comprises:

identifying four degrees of freedom for each pixel, the longitude ($\phi$), the latitude ($\theta$), the image rotation ($v$) and the separation ($\chi$);

calculating for each pixel, a function $f(\phi, \theta, v, \chi)$, thereby obtaining a point in the map of the organ to be visualized, wherein this point is illuminated on a screen of a computer having a predefined color;

visually checking the matching coherence between adjacent files to be visualized on the screen; and if the result is not satisfactory, changing the values of $\phi$, $\theta$, $v$, and $\chi$ and reiterating the calculations and the display until the result is satisfactory, in which case the image is assembled.

18. The method according to claim 11, wherein the smoothing of the video image is generated by computing a plurality of image textures and by plotting the color of a pixel from a linear interpolation between two consecutive textures.

19. The method according to claim 11, wherein to plot one part of the simulated organ in another part belonging to said organ, the method further comprises polygon cutting employing the Sutherland-Hodgman algorithm.

20. The method according to claim 11, wherein the angular position of the actuated manual control is fully registered in order to simulate the relative displacement of the simulated examination lens by a single sensor.

21. The method according to claim 11, wherein the performance of the simulated intervention on the organ is recorded.

22. The method according to claim 11, wherein the organ is the fundus of eye and, in order to simulate the examination lens, the method further comprises simulating a lens with three mirrors, the movements of which are described by three rotations, one about its axis of revolution and the other two about the center of the cornea of the simulated fundus of eye, respectively in a horizontal plane and in a vertical plane, by modelling the spherical optical lens by a circle in a plane and the three mirrors by three planes.

23. The method according to claim 22, wherein a video image of the simulated eye to be examined is generated from the at least one digitized photograph, the eye model used being a sphere cut into facets, the iris of which is modelled by a flat ring.

24. The method according to claim 23, wherein said video image of the eye is generated by reconstructing a complete image of the eye from a plurality of digitized photographs and by juxtaposing the said photographs edge-to-edge while attempting to respect the continuity of the blood vessels.

* * * * *